(12) United States Patent
Biskeborn

(10) Patent No.: US 11,817,137 B1
(45) Date of Patent: Nov. 14, 2023

(54) HIGH CONCURRENT CHANNELS MAGNETIC RECORDING HEAD HAVING SAME-GAP-VERIFY AND MULTIPLE SERVO READERS

(71) Applicant: Western Digital Technologies, Inc., San Jose, CA (US)

(72) Inventor: Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/849,512

(22) Filed: Jun. 24, 2022

(51) Int. Cl.
*G11B 5/592* (2006.01)
*G11B 5/008* (2006.01)
*G11B 5/48* (2006.01)

(52) U.S. Cl.
CPC ........ *G11B 5/5926* (2013.01); *G11B 5/00826* (2013.01); *G11B 5/4893* (2013.01)

(58) Field of Classification Search
None
See application file for complete search history.

(56) References Cited

U.S. PATENT DOCUMENTS

| | | | | |
|---|---|---|---|---|
| 6,426,846 | B1* | 7/2002 | Chliwnyj | G11B 5/584 |
| 7,570,450 | B2* | 8/2009 | Koeppe | G11B 5/3977 |
| | | | | 360/75 |
| 8,988,817 | B1 | 3/2015 | Cherubini et al. | |
| 9,251,825 | B2 | 2/2016 | Biskeborn et al. | |
| 10,199,060 | B2 | 2/2019 | Biskeborn | |
| 10,453,484 | B2 | 10/2019 | Biskeborn | |
| 10,783,924 | B2 | 9/2020 | Olson et al. | |
| 10,832,712 | B1* | 11/2020 | Seagle | G11B 5/17 |
| 2003/0189782 | A1* | 10/2003 | Leonhardt | G11B 5/584 |
| 2007/0097556 | A1* | 5/2007 | Biskeborn | G11B 5/40 |
| 2008/0037154 | A1* | 2/2008 | Biskeborn | G11B 5/00826 |
| 2009/0213488 | A1 | 8/2009 | Saliba et al. | |
| 2009/0231756 | A1* | 9/2009 | Koeppe | G11B 5/4893 |
| | | | | 360/110 |
| 2015/0077881 | A1 | 3/2015 | Biskeborn et al. | |
| 2021/0011084 | A1 | 1/2021 | Bezzam et al. | |

OTHER PUBLICATIONS

Raymond, Robert et al., "INSIC Technology Roadmap", Jul. 2019, pp. 1-28, <http://www.insic.org/wp-content/uploads/2019/07/INSIC-Technology-Roadmap-2019.pdf>.

* cited by examiner

*Primary Examiner* — Peter Vincent Agustin
(74) *Attorney, Agent, or Firm* — PATTERSON + SHERIDAN, LLP; Steven H. VerSteeg

(57) ABSTRACT

The present disclosure generally relates to a tape drive including a tape head. The tape head comprises one or more modules, each module comprising a plurality of writers disposed in a first row, a plurality of readers disposed in a second row parallel to the first row, a first servo reader aligned with either the first row or the second row, and a second servo reader aligned in a third row parallel to the first and second rows. The first servo reader and the second servo reader are offset from one another in a first direction and in a second direction perpendicular to the first direction, the first direction being a cross-track direction. The first servo reader and the second servo reader are spaced apart in the first direction about 1 μm to about 20 μm.

21 Claims, 19 Drawing Sheets

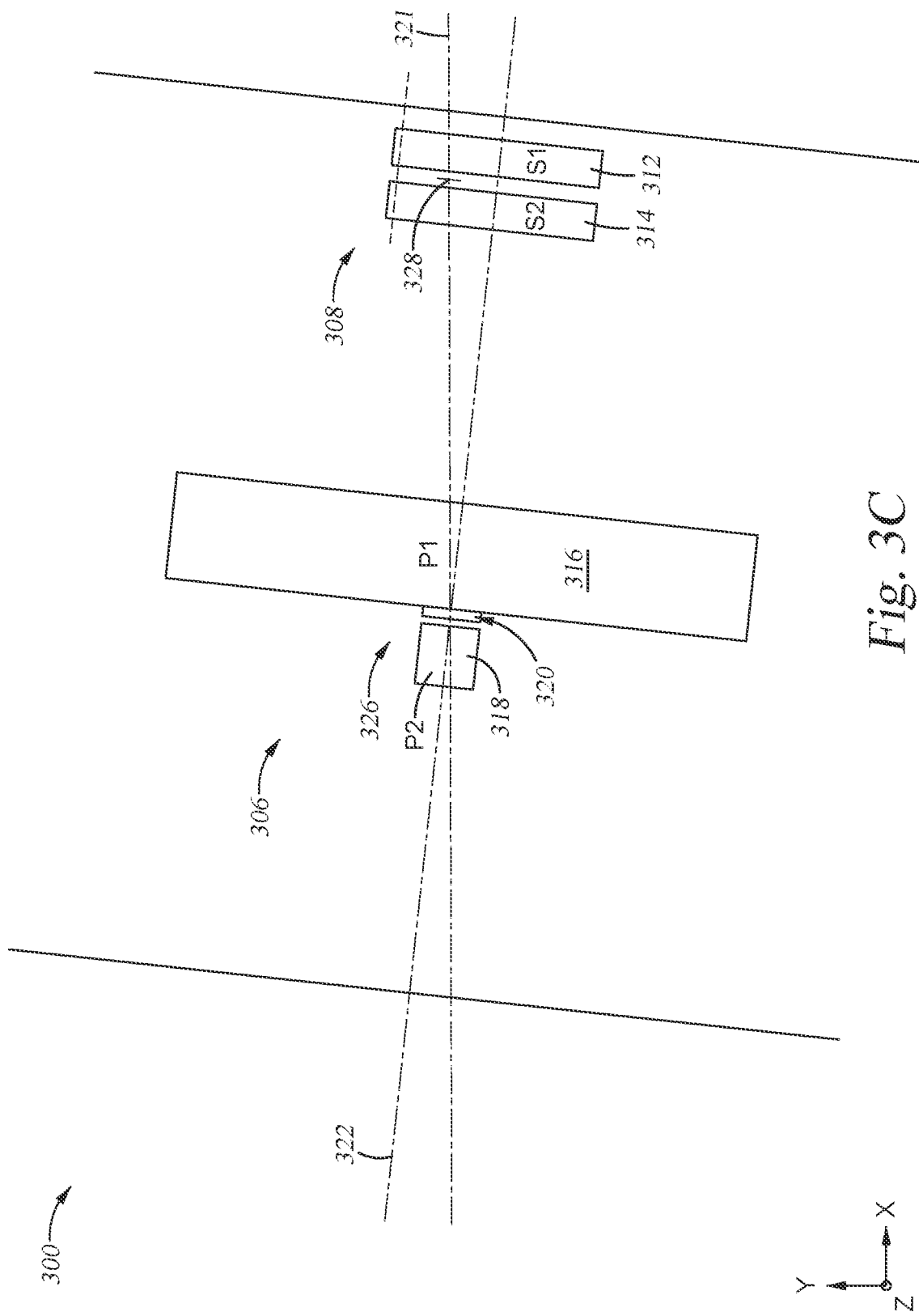

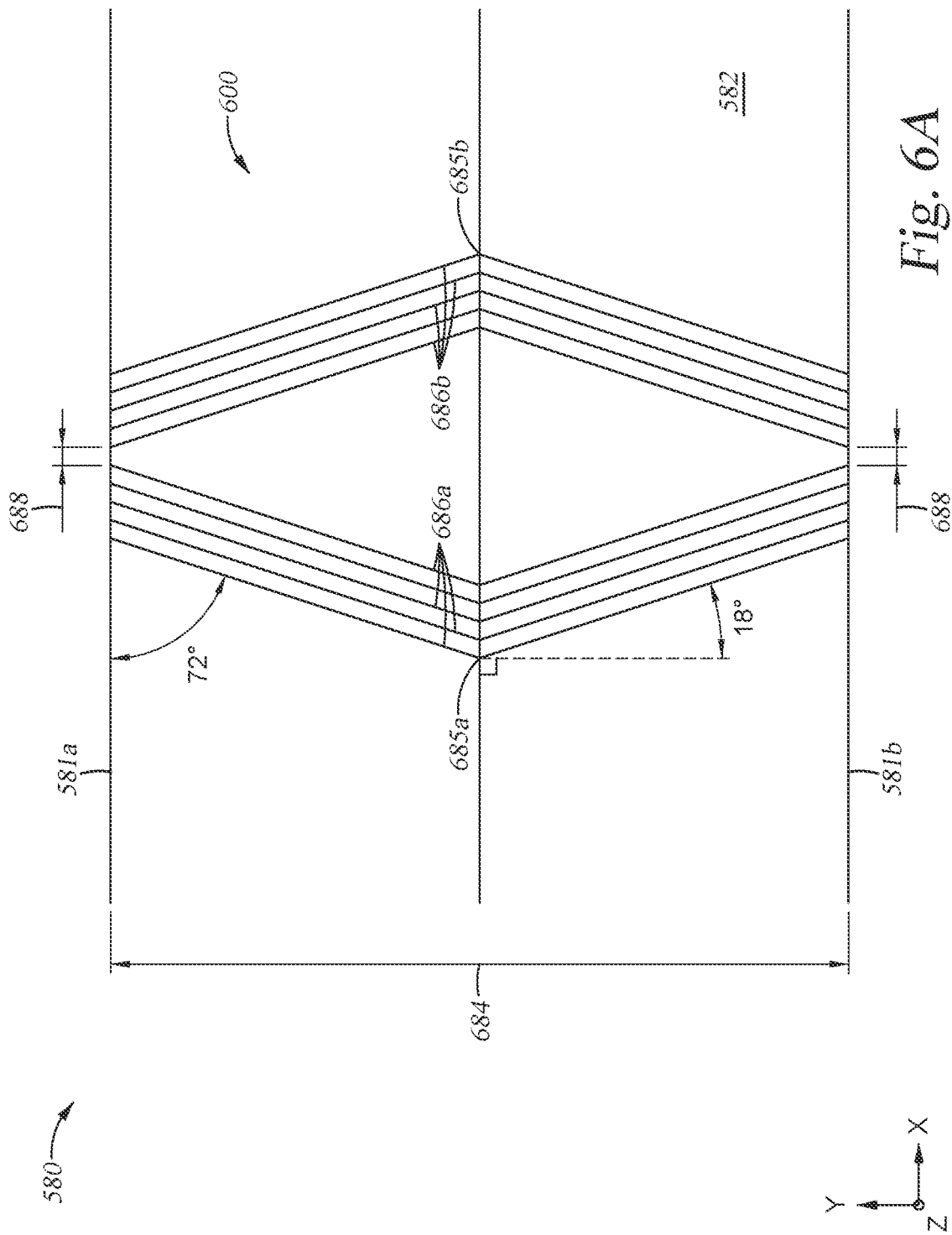

HIGH CONCURRENT CHANNELS MAGNETIC RECORDING HEAD HAVING SAME-GAP-VERIFY AND MULTIPLE SERVO READERS

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. However, tapes may stretch and/or compress both in tape length and width over time, referred to as tape dimensional stability (TDS) effects, due to a variety of reasons, such as environmental causes like humidity and temperature, workload, and general wear of the tape. As such, as the tape stretches and compresses, the positioning information in the servo tracks may become outdated, thus making accurate positioning of the tape head difficult.

Therefore, there is a need in the art for a tape drive capable of compensating for tape dimensional stability effects.

SUMMARY OF THE DISCLOSURE

The present disclosure generally relates to a tape drive including a tape head. The tape head comprises one or more modules, each module comprising a plurality of writers disposed in a first row, a plurality of readers disposed in a second row parallel to the first row, a first servo reader aligned with either the first row or the second row, and a second servo reader aligned in a third row parallel to the first and second rows. The first servo reader and the second servo reader are offset from one another in a first direction and in a second direction perpendicular to the first direction, the first direction being a cross-track direction. The first servo reader and the second servo reader are spaced apart in the first direction about 1 μm to about 20 μm.

In one embodiment, a tape head comprises one or more modules, each of the one or more modules comprising: a plurality of writers disposed in a first row, a plurality of readers disposed in a second row parallel to the first row, a first servo reader aligned with either the first row or the second row, and a second servo reader aligned in a third row parallel to the first and second rows, wherein: the first servo reader and the second servo reader are offset from one another in a first direction and in a second direction perpendicular to the first direction, the first direction being a cross-track direction, and the first servo reader and the second servo reader are spaced apart in the first direction about 1 μm to about 20 μm.

In another embodiment, a tape head comprises one or more modules, each of the one or more modules comprising: a plurality of writers disposed in a first row, a plurality of readers disposed in a second row parallel to the first row, a first servo reader aligned with either the first row or the second row, the first servo reader comprising a first magnetic sensor, and a second servo reader aligned in a third row parallel to the first and second rows, wherein the second servo reader comprising a second magnetic sensor, and wherein the first magnetic sensor of the first servo reader and the second magnetic sensor of the at least one second servo reader are spaced apart in a first direction perpendicular to the first row a distance of about 1 μm to about 20 μm, the first direction being a cross-track direction.

In yet another embodiment, a tape head comprises one or more modules, each of the one or more modules comprising: a plurality of writers disposed in a first row in a first wafer portion, a plurality of readers disposed in a second row parallel to the first row in a second wafer portion, the first and second wafer portions being coupled together, a first servo reader aligned with the second row in the second wafer portion, and a second servo reader aligned in a third row parallel to the first and second rows in the second wafer portion, wherein: the first servo reader and the second servo reader are spaced apart in a first direction perpendicular to the first row a first distance of about 1 μm to about 10 μm, the first direction being a cross-track direction, and the first servo reader and the second servo reader are spaced apart in a second direction perpendicular to the first direction a second distance of about 1 μm to about 20 μm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3C illustrates the SGV module FIG. 3A in a tilted configuration, according to one embodiment.

FIG. 6A illustrates an exemplary servo pattern of the tape of FIGS. 5A-5B, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive including a tape head. The tape head comprises one or more modules, each module comprising a plurality of writers disposed in a first row, a plurality of readers disposed in a second row parallel to the first row, a first servo reader aligned with either the first row or the second row, and a second servo reader aligned in a third row parallel to the first and second rows. The first servo reader and the second servo reader are offset from one another in a first direction and in a second direction perpendicular to the first direction, the first direction being a cross-track direction. The first servo reader and the second servo reader are spaced apart in the first direction about 1 μm to about 20 μm.

Figure 1A:
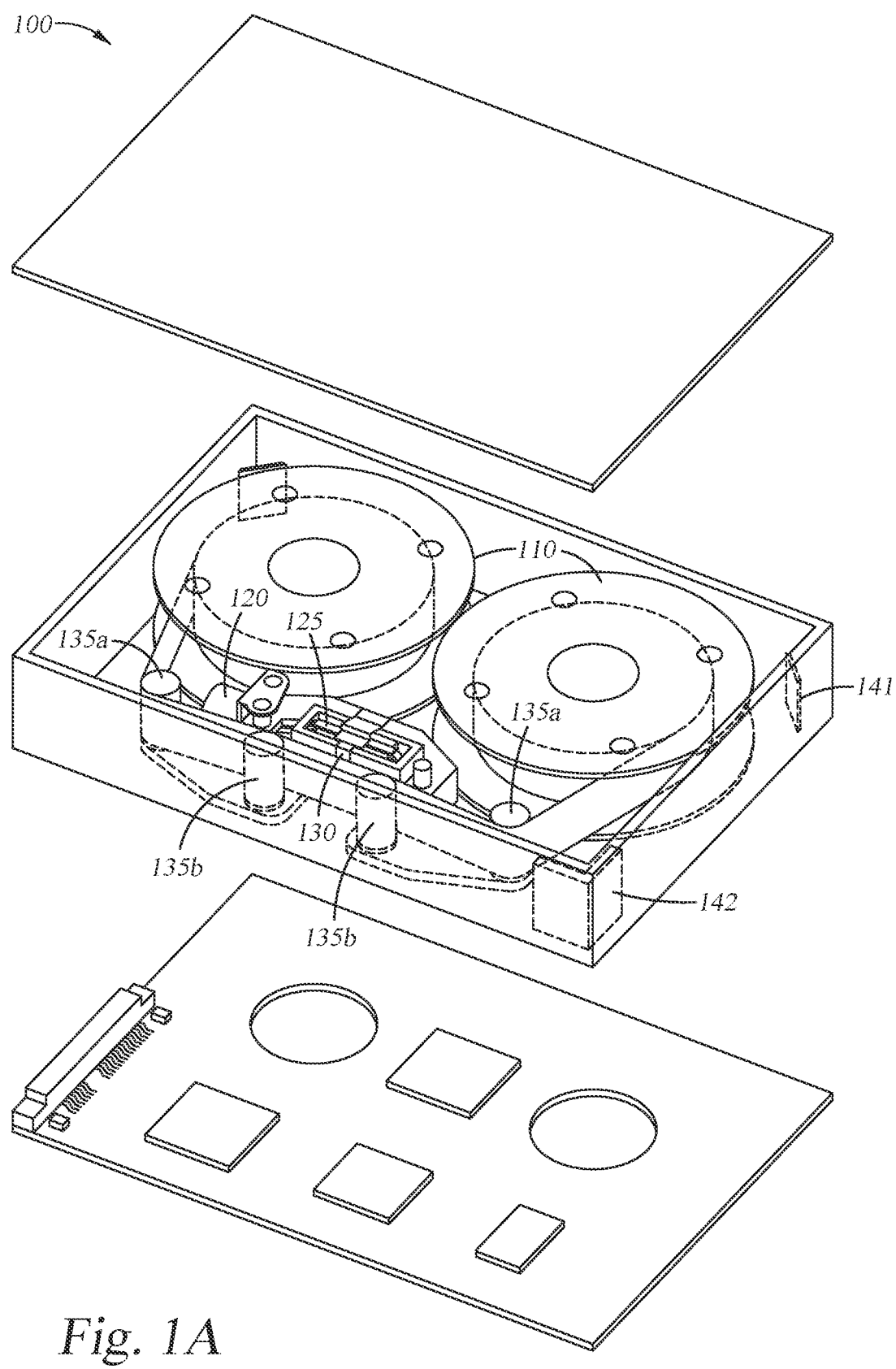
FIGS. 1A-1C illustrate a perspective exploded view, a simplified top down, and side profile view of a tape drive, in accordance with some embodiments.
Figure 1B:
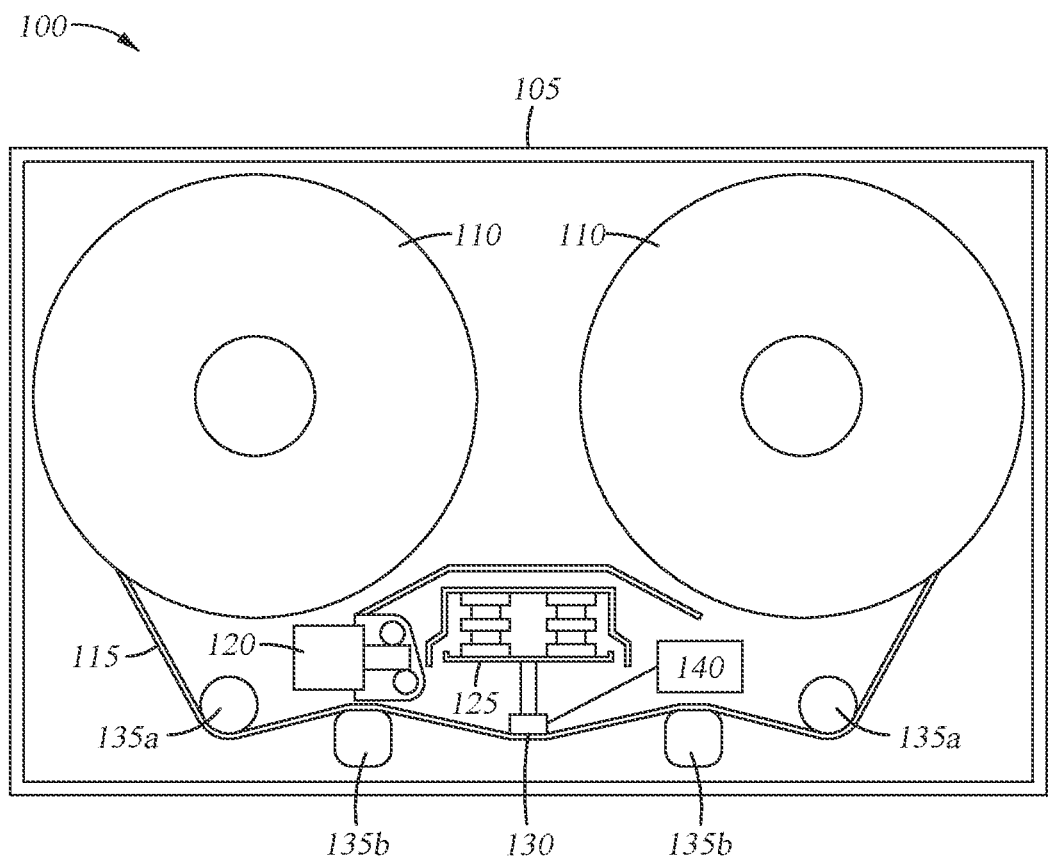
Figure 1C:
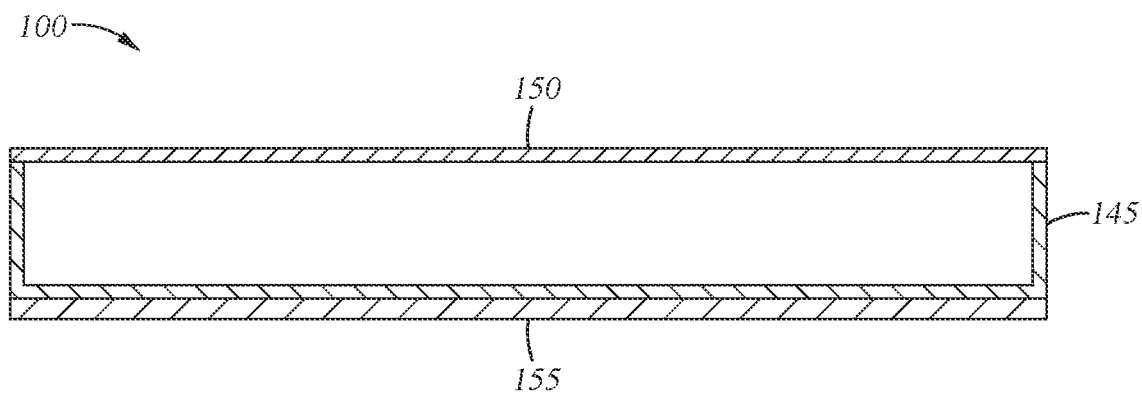

FIGS. 1A-1C illustrate a perspective exploded view, a simplified top down, and side profile view of a tape drive 100, in accordance with some embodiments. The tape drive 100 may be a tape embedded drive (TED).

Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
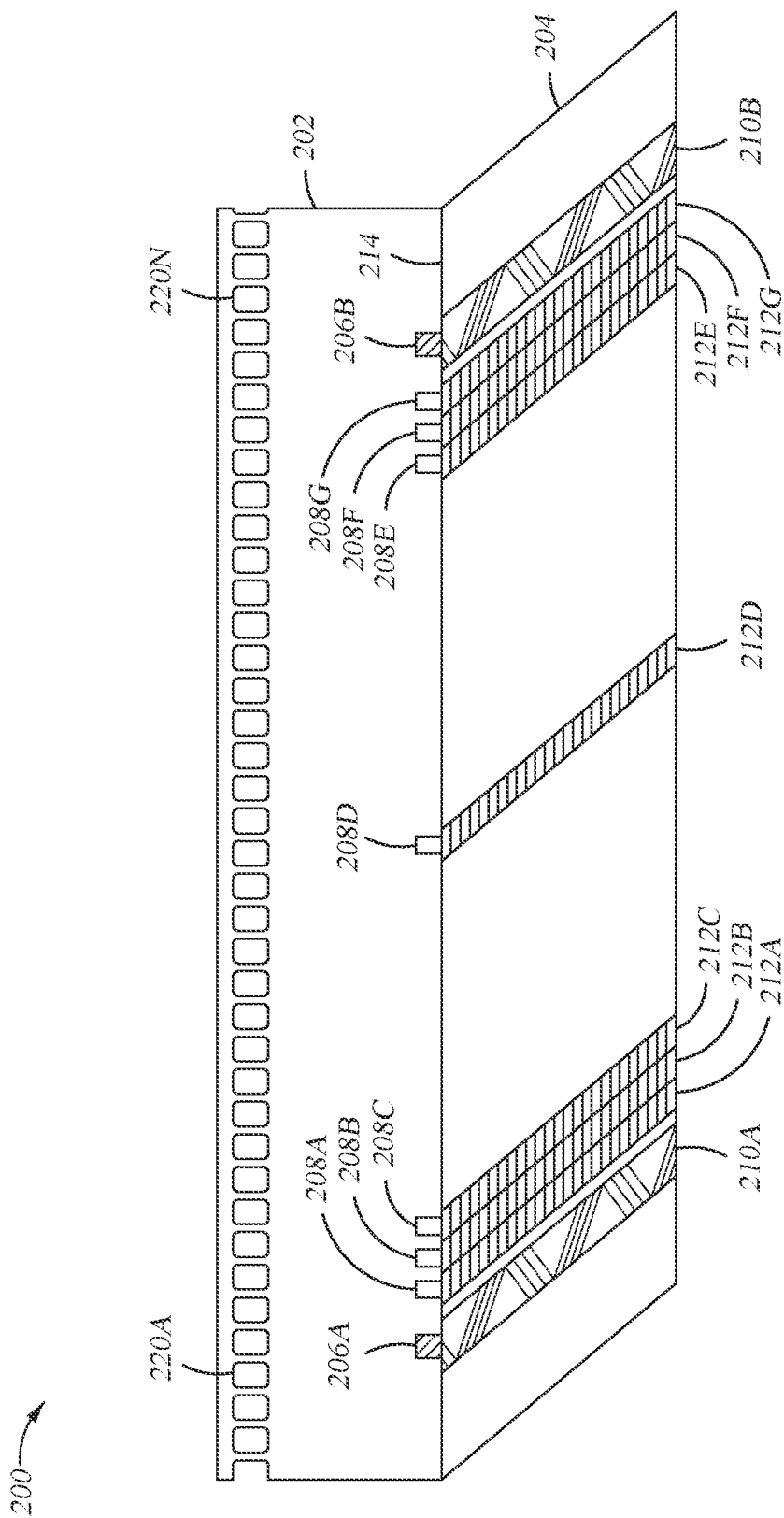
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
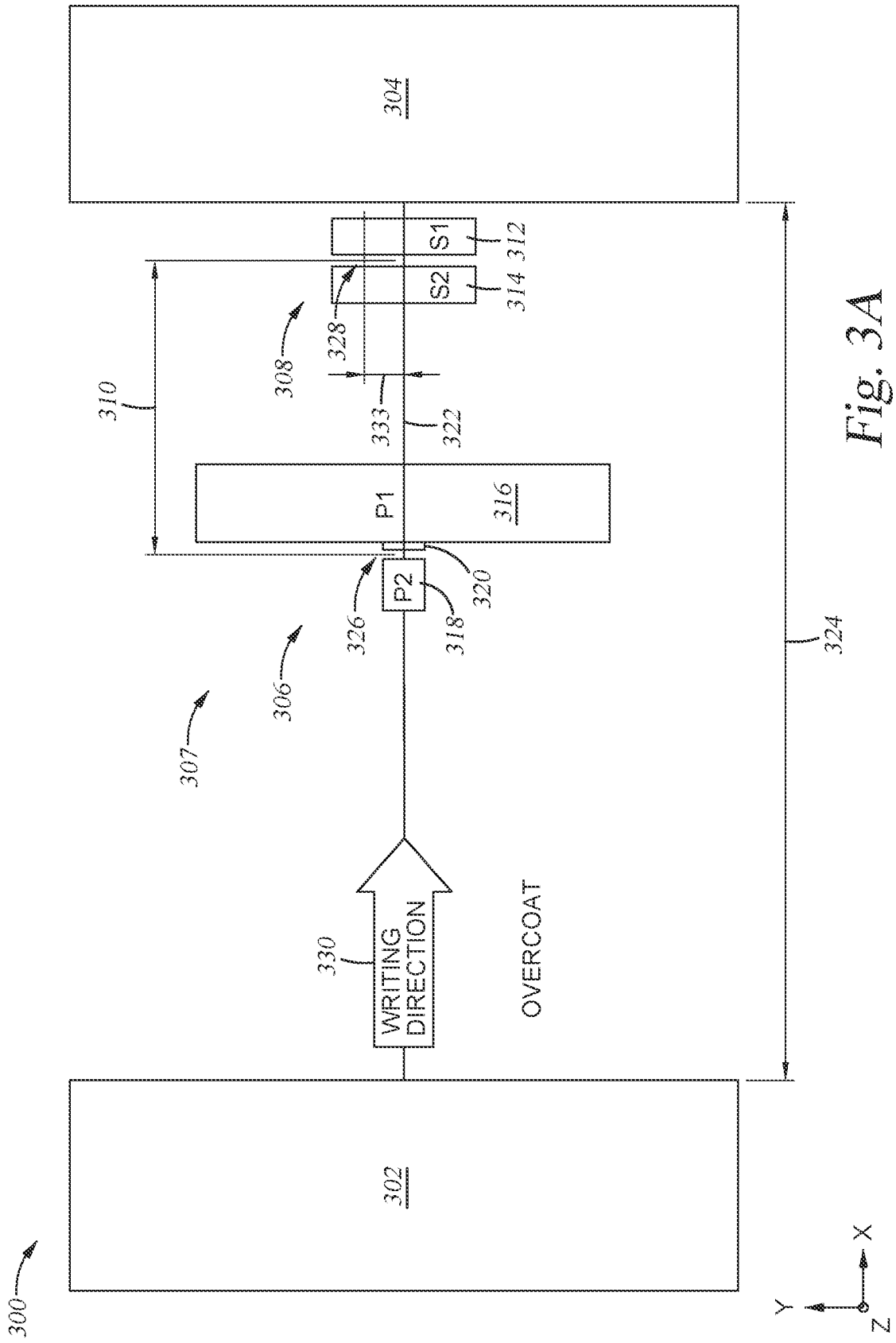
FIGS. 3A-3B illustrate a media facing surface (MFS) view of same gap verify (SGV) modules, configured to dynamically tilt, according to various embodiments.
Figure 3B:
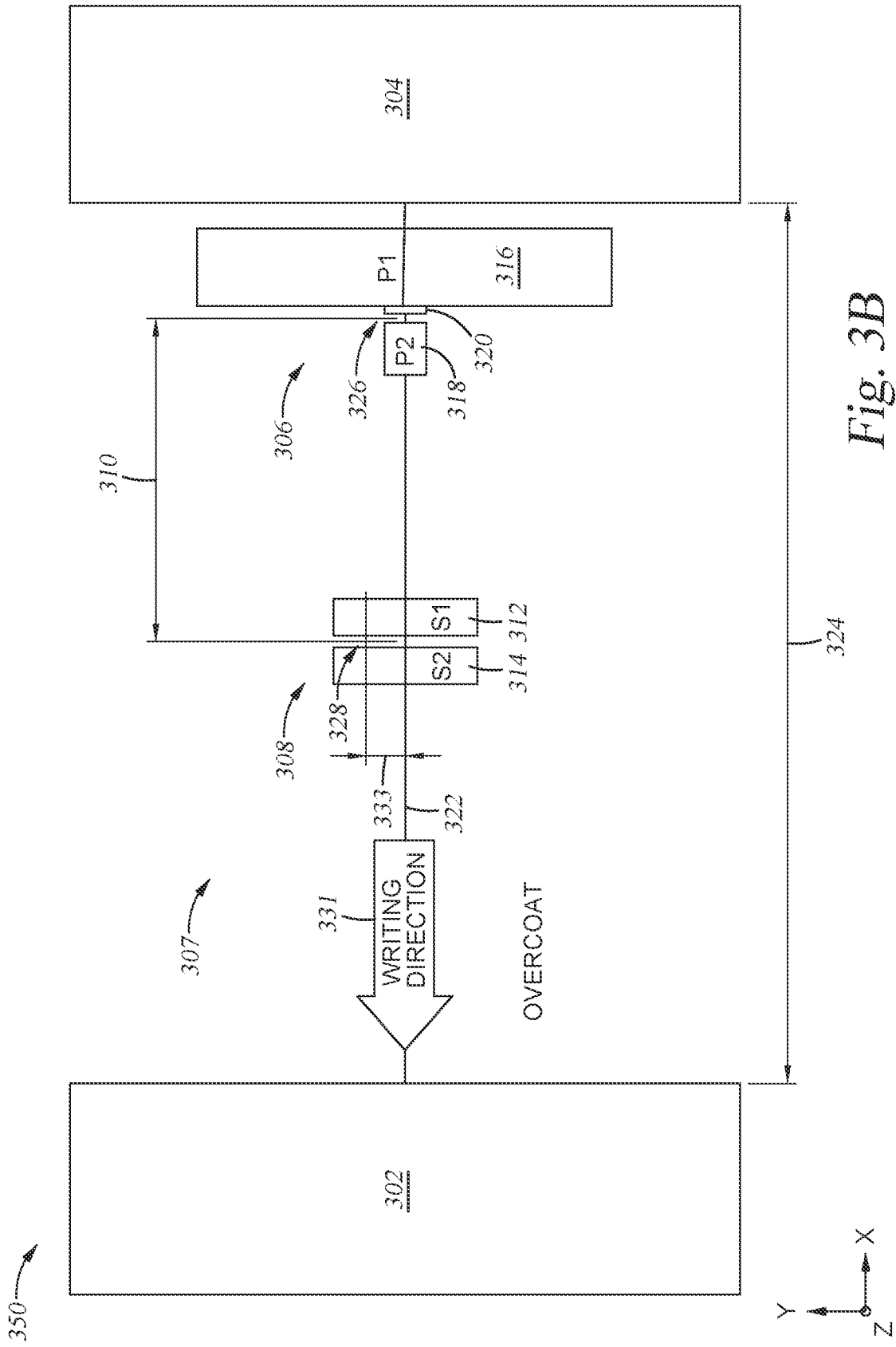

FIGS. 3A-3B illustrate a media facing surface (MFS) view of same gap verify (SGV) modules 300, 350, respectively, configured to dynamically tilt, according to various embodiments. The SGV modules 300, 350 may be utilized within a tape drive comprising a controller, such as the TED or tape drive 100 of FIG. 1A. The SGV modules 300, 350 utilized with, or be a part of, the tape head module 200 of FIG. 2. In FIGS. 3A-3B, the SGV modules 300, 350 are shown in an un-tilted configuration. FIG. 3C illustrates the SGV module 300 of FIG. 3A in a tilted configuration, according to one embodiment.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV module 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write element(s) 306, and the read transducer(s) 308 may be referred to as a reader(s) 308 or read element(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, as discussed below, the SGV modules 300, 350 each comprises a head array of 64 writers 306 and 64 readers 308, forming 64 writer 306 and reader 308 pairs, along with a plurality of servo readers (not shown).

In each of the SGV modules 300, 350, a writer 306 is spaced a distance 310 from a reader 308 of about 6 μm to about 20 μm, such as about 6 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 60 μm. In some embodiments, a shield (not shown) is disposed between the writer 306 and the reader 308 of each pair to reduce cross-talk signals to the reader 308 from the writer 306.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. In some embodiments, the distance 310 is measured from the write gap 326 to an MgO layer (not shown) of the magnetic sensor 328.

In the un-tilted configuration of FIGS. 3A-3B, the magnetic sensor 328 is offset or unaligned from the paired write gap 326 in the y-direction. A centerline 322 of the write gap 326 is offset a distance 333 from a centerline of the magnetic sensor 328, or vice versa. The distance 333 is between about 200 nm to about 2000 nm, such as about 1250 nm, and is chosen to give proper alignment when the SGV modules 300, 350 are statically rotated. While the magnetic sensor 328 is described herein as being offset from the paired write gap 326 by the distance 333, the write gap 326 may instead be offset from the paired magnetic sensor 328 by the distance 333. As such, the write gap 326 may be offset or unaligned from the paired magnetic sensor 328 in the −y-direction.

The magnetic sensor 328 of the reader 308 is offset the distance 333 from the centerline 322 of the write gap 326 of the paired writer 306 to enable the SGV module 300 to tilt, as shown in FIG. 3C. In one embodiment, the tape drive is configured to dynamically tilt each of the SGV modules 300, 350 in order to write to and read data from a tape or other magnetic media. Each SGV module 300, 350 is statically tilted in the xy-direction about 1° to about 12°, such as about 6°, from the centerline 322 to allow the reader 308 to align with the writer 306, as demonstrated by line 321. Each SGV module 300, 350 is then placed in the tape drive at the nominal tilted angle, and the tape drive, or a controller of the tape drive, is configured to make small dynamic changes to the tilt angle of each SGV module 300, 350. For example, the SGV modules 300, 350 may tilt to accurately read data from a tape that has been distorted or stretched. Tilting the SGV modules 300, 350 enables correction of mis-registration caused by tape lateral dimensional changes. However, in some embodiments, the magnetic sensor 328 of the reader 308 may be aligned with the write gap 326 of the paired writer 306, for example, on the centerline 322.

In the SGV module 300 of FIG. 3A, when writing data to a tape or other media, the tape moves over the writer 306 in the writing direction 330 (e.g., in the x-direction). In the SGV module 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly when tilted, as shown by line 321. Thus, the writer 306 is able to write data to a portion of the tape, and the paired reader 308 is able to read verify the newly written portion of the tape immediately. As such, the SGV module 300 is able to write data to and read verify data from a tape concurrently. The SGV module 350, similar constructed, also has this immediate verify capability.

The SGV modules 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV modules 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV modules 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4A:
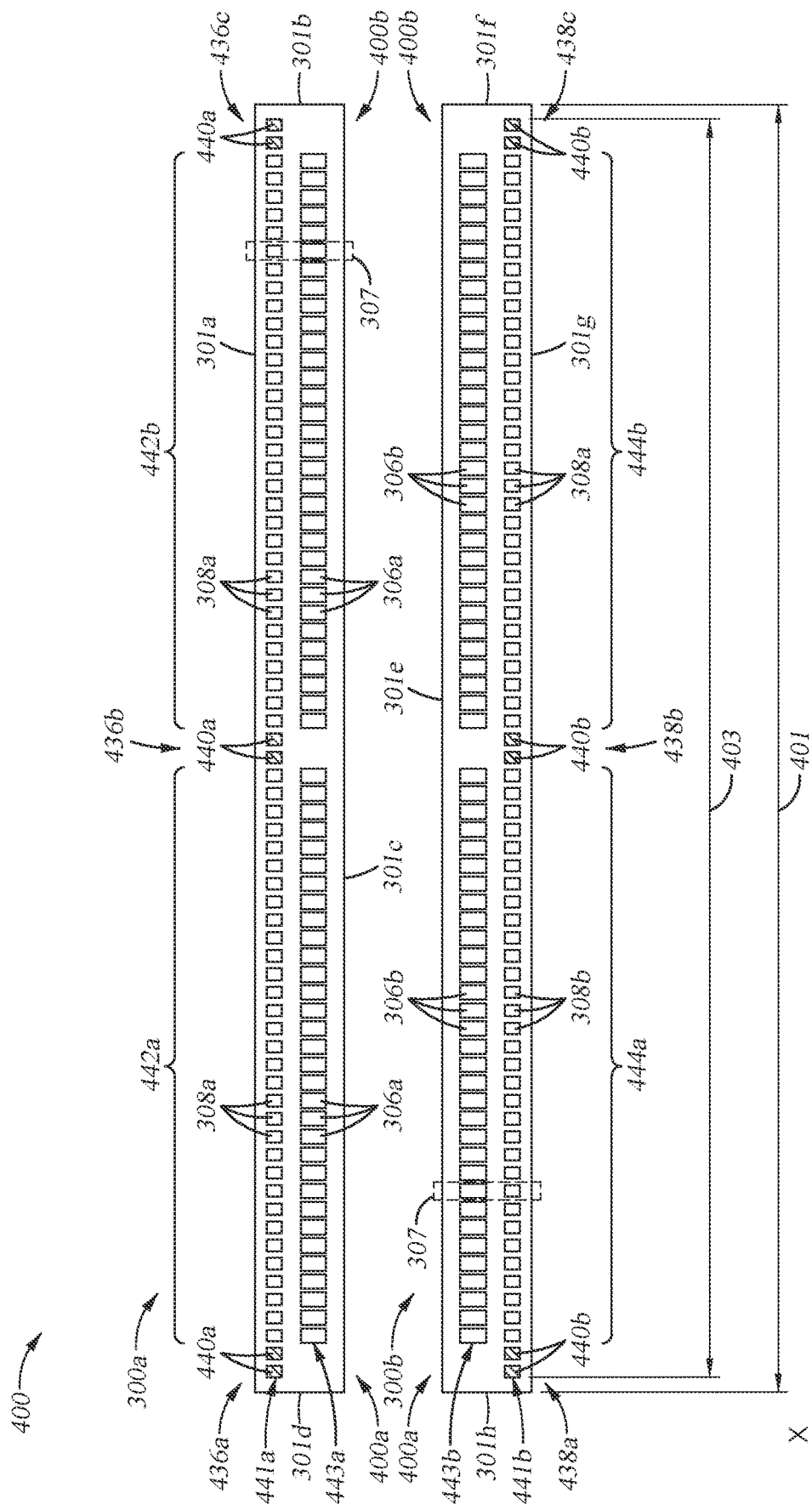
FIG. 4A illustrates a MFS view of a tape head comprising two SGV modules of either FIG. 3A or FIG. 3B, according to one embodiment.

FIG. 4A illustrates a MFS view of a tape head 400 comprising two SGV modules 300a, 300b, according to one embodiment. The tape head 400 may be utilized within a tape drive comprising a controller, such as the TED or tape drive 100 of FIG. 1A. The SGV modules 300a, 300b may be the SGV module 300 of FIGS. 3A and 3C, or the SGV modules 300a, 300b may be the SGV module 350 of FIG. 3B. The first and second SGV modules 300a, 300b are disposed adjacent to and are aligned with one another in the x-direction, the y-direction, and the z-direction. The first and second SGV modules 300a, 300b may be coupled together or spaced apart.

The first SGV module 300a comprises 64 writers 306a and 64 readers 308a. The 64 readers 308a are aligned in a first row 441a and the 64 writers 306a are aligned in a second row 443a parallel to the first row 441a. More specifically, the first SGV module 300a comprises a first set 442a of 32 writers 306a aligned or paired with 32 readers 308a, and a second set 442b of 32 writers 306a aligned or paired with 32 readers 308a. A pair of writers 306a and readers 308a may be referred to more generally as a data element 307 or a data element 307a. While the writers 306a and the readers 308a are aligned, the magnetic sensor of the readers 308a and the write gaps of the writers 306a may be offset or unaligned to allow the tape head 400 to dynamically tilt the first SGV module 300a, as discussed above. Each of the 64 writers 306a is configured to write data concurrently, and each of the 64 readers 308a is configured to read data concurrently. While each SGV module 300a, 300b is illustrated as comprising 64 writers 306a, 306b and 64 readers 308a, 308b, the SGV modules 300a, 300b may comprise a greater or fewer number of both writers 306a, 306b and readers 308a, 308b.

A plurality of servo readers 440a are aligned with the readers 308a. The plurality of servo readers 440a may also be referred to more generally as a data element 307. For instance, a first pair or group 436a of two servo readers 440a are disposed at a first end 400a of the first row 441a, a second pair or group 436b of two servo readers 440a are disposed between the first set 442a of readers 308a and the second set 442b of readers 308a, and a third group or pair 436c of two servo readers 440a are disposed at a second end 400b of the first row 441a opposite the first end 400a. While three groups 436a, 436b, 436c of two servo readers 440a are shown, each group 436a, 436b, 436c may comprise a greater or lesser number of servo readers 440a. Furthermore, the second row 443a of writers 306a is spaced apart between the first set 442a and second set 442b to accommodate for the space needed for the second pair 436b of servo readers 440a.

Each of the 64 writers 306a, 64 readers 308a, and 6 servo readers 440a is surrounded by a first continuous surface 301a of the module 300a, a second continuous surface 301b of the module 300a, a third continuous surface 301c of the module 300a, and a fourth continuous surface 301d of the module 300a, where the first, second, third, and fourth surfaces 301a-301d are connected together to form one continuous surface. In other words, the module 300a comprising 64 writers 306a, 64 readers 308a, and 6 servo readers 440a is only one module, rather than two or more modules coupled together. As such, the data elements 307 of the module 300a are all disposed between one substrate and one closure, such as the substrate 304 and closure 302 of FIGS. 3A-3B.

Similarly, the second SGV module 300b comprises 64 writers 306b and 64 readers 308b. The 64 writers 306b are aligned in a third row 443b and the 64 readers 308b are aligned in a fourth row 441b parallel to the third row 441b. The third and fourth rows 441b, 443b are disposed parallel to the first and second rows 441a, 443a, as the first and second SGV modules 300a, 300b are disposed adjacent to one another. While the second row 443a of writers 306a of the first SGV module 300a is disposed adjacent to the third row 443b of writers 306b of the second SGV module 300b, the first row 441a of readers 308a of the first SGV module 300a may instead be disposed adjacent to the fourth row 441b of readers 308b of the second SGV module 300b.

The second SGV module 300b comprises a first set 444a of 32 writers 306b aligned or paired with 32 readers 308b, and a second set 444b of 32 writers 306b aligned or paired with 32 readers 308b. A pair of writers 306b and readers 308b may be referred to as a data element 307 or a data element 307b. While the writers 306b and the readers 308b are aligned, the magnetic sensor of the readers 308b and the write gaps of the writers 306b may be offset or unaligned to allow the tape head 400 to dynamically tilt the second SGV module 300b, as discussed above. Each of the 64 writers 306b is configured to write data concurrently, and each of the 64 readers 308b is configured to read data concurrently.

A plurality of servo readers 440b are aligned with the readers 308b. For instance, a first group or pair 438a of two servo readers 440b are disposed at a first end 400a of the fourth row 441b, a second group or pair 438b of two servo readers 440b are disposed between the first set 444a of readers 308b and the second set 444b of readers 308b, and a third group or pair 438c of two servo readers 440b are disposed at a second end 400b of the fourth row 441b opposite the first end 400a. While three groups 438a, 438b, 438c of two servo readers 440b are shown, each group 438a, 438b, 438c may comprise a greater or lesser number of servo readers 440b. Furthermore, the third row 443b of writers 306b is spaced apart between the first set 444a and second set 444b to accommodate for the space needed for the second pair 438b of servo readers 440b.

Each of the 64 writers 306b, 64 readers 308b, and 6 servo readers 440b is surrounded by a first continuous surface 301e of the module 300b, a second continuous surface 301f of the module 300b, a third continuous surface 301g of the module 300b, and a fourth continuous surface 301h of the module 300b, where the first, second, third, and fourth surfaces 301e-301h are connected together to form one continuous surface. In other words, the module 300b comprising 64 writers 306b, 64 readers 308b, and 6 servo readers 440b is only one module, rather than two or more modules coupled together. As such, the data elements 307 of the module 300b are all disposed between one substrate and one closure, such as the substrate 304 and closure 302 of FIGS. 3A-3B.

In some embodiments, the first SGV module 300a writes data to and read verifies data from a tape when the tape moves in a first direction, such as in the y-direction, and the second SGV module 300b writes data to and read verifies data from a tape when the tape moves in a second direction opposite the first direction, such as in the −y-direction. In such embodiments, since only one SGV module 300a or 300b is writing and/or reading data at a time, the tape head 400 may be configured for upstream and downstream flying over the module 300a, 300b not currently in use. An example tape head or tape drive configured to enable upstream and/or downstream flying, as well as an example of a writer and a reader of a module being aligned along a center axis, is described in co-pending patent application titled "Tape Drive Configured to Enable Magnetic Media to Fly Above an Upstream or a Downstream Module," U.S. application Ser. No. 17/512,127, filed Oct. 27, 2021, assigned to the same assignee of this application, which is herein incorporated by reference.

While the readers 308a, 308b and the writers 306a, 306b of each SGV module 300a, 300b are divided into two sets 442a, 442b, 444a, 444b, each module 300a, 300b is one continuous module (i.e., not two modules of 32 data elements connected together). Each SGV module 300a, 300b has a total length 401 in the x-direction of at least 12 mm, such as about 13 mm to about 14 mm, such as about 13.6 mm. The distance 403 between the first servo reader 440a of the first pair 436a to the second servo reader 440a of the third pair 436c, and the distance 403 between the first servo reader 440b of the first pair 438a to the second servo reader 440b of the third pair 438c, is less than the length 401 of the first and SGV modules 300a, 300b and less than a width of a tape. However, the distance 403 in some embodiments may be about 5% to about 15% less than a width of the tape. Because each SGV module 300a, 300b comprises 64 writers 306a, 306b and 64 readers 308a, 308b, the each SGV module 300a, 300b may span the entire width of a tape, such as a tape having a width of about 0.5 inches, as each SGV module 300a, 300b has a length 401 greater than a width of a tape, which is discussed further below.

Figure 4B:
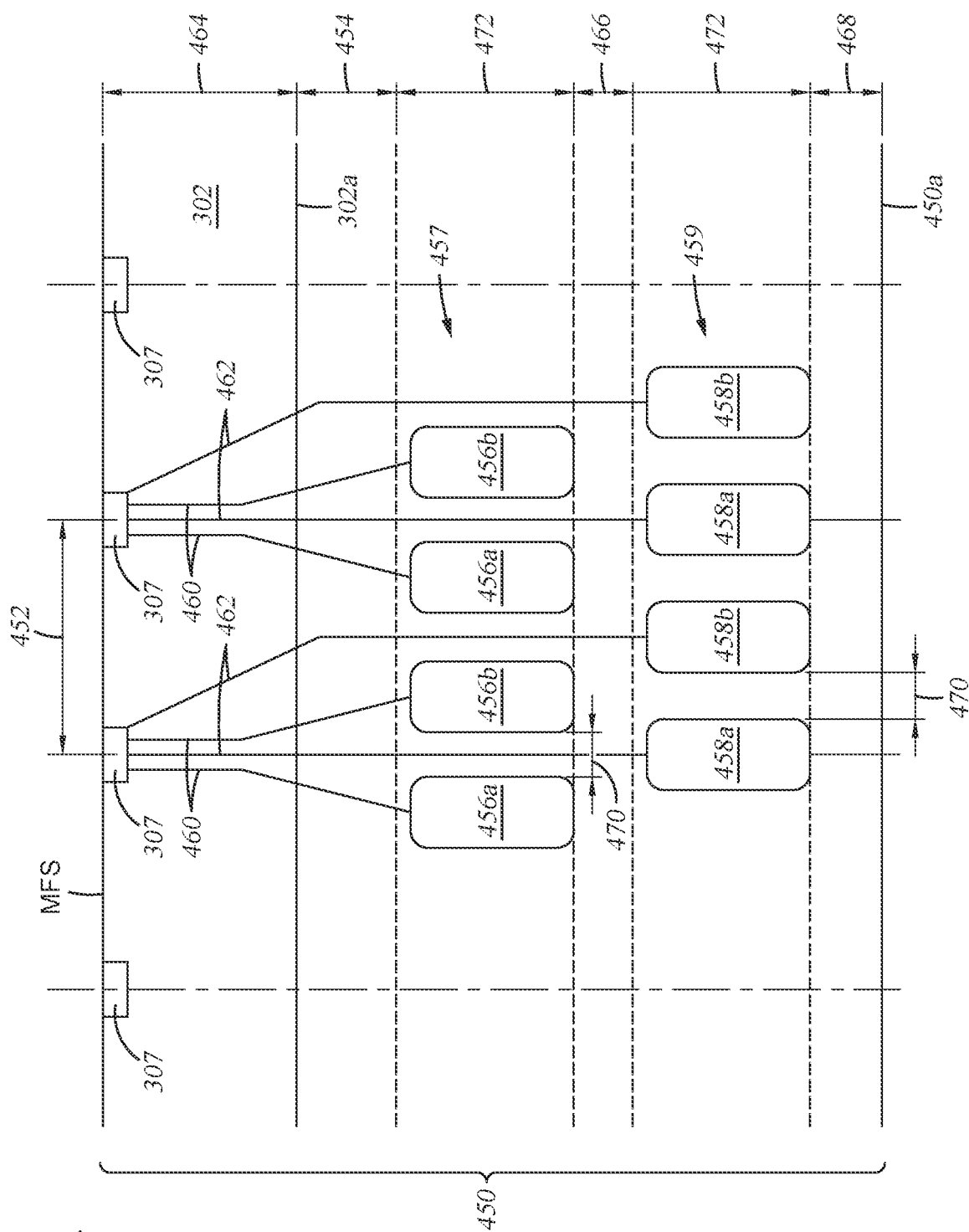
FIG. 4B illustrates a plan view of portions of the SGV modules of the tape head of FIG. 4A, according to one embodiment.

FIG. 4B illustrates a plan view of aspects of the SGV modules 300a, 300b of the tape head 400 of FIG. 4A, according to one embodiment. The first and second modules 300a, 300b may be collectively referred to as SGV modules 300, the readers 308a, 308b may be collectively referred to as readers 308, the writers 306a, 306b may be collectively referred to as writers 306, and the servo readers 440a, 440b may be collectively referred to as servo readers 440.

FIG. 4B illustrates four data elements 307 disposed at the MFS of a chip 450 of a SGV module 300, where each data element 307 comprises a writer 306 and reader 308 pair. While only four data elements 307 are shown in FIG. 4B, each SGV module 300 comprises 64 writer 306 and reader 308 pairs and six servo readers 440. As such, FIG. 4B is exemplary only, and the number of data elements 307 is not intended to limiting with respect to FIG. 4B.

The chip 450 has a depth in the z-direction from the MFS to a surface 450a opposite the MFS of about 525 μm to about 575 μm, such as about 555 μm. The data elements 307 are disposed at the MFS on the closure 302. The chip 450 comprises the closure 302, and the closure 302 has a depth 464 in the z-direction extending from the MFS towards a surface 302a opposite the MFS of about 125 μm to about 150 μm, such as about 135 μm.

Each data element 307 in each SGV module 300 is spaced apart a distance 452 in the y-direction at the MFS of about 150 μm to about 200 μm, such as about 175 μm. Comparatively, data elements in conventional modules of tape heads are spaced apart a distance of about 80 μm to about 85 μm, such as about 83 μm. In some embodiments, each data track of a tape, such as a 0.5 inch tape, has a track pitch about equal to the distance 452 the data elements 307 are spaced apart, such as about 175 μm. Each data element 307 is further coupled to a plurality of bond pads that are recessed from the MFS, where the writer 306 of each data element 307 is coupled to a first bond pad 456a and a second bond pad 456b, and the reader 308 of each data element 307 is coupled to a third bond pad 458a and a fourth bond pad 458b. The first and second bond pads 456a, 456b may be referred to herein as writer bond pads 456, and the third and fourth bond pads 458a, 458b may be referred to herein as reader bond pads 458. Each servo reader 440 can be similarly wired as a data element 307 as shown; however, each servo reader 440 would comprise only two bond pads, such as the reader bond pads 458.

In some embodiments, all of the writer bond pads 456 of a SGV module 300 are disposed in a first row 457 in the y-direction, and all of the reader bond pads 458 of the SGV module 300 are disposed in a second row 459 parallel to the first row 457. The writer bond pads 456 are disposed at a different depth in the y-direction than the reader bond pads 458. Furthermore, the writer bond pads 456 are offset from the reader bond pads 458 in the y-direction. In other words, the writer bond pads 456 are not aligned with the reader bond pads 458 in the z-direction or in the y-direction, but rather, are stacked and staggered from one another.

The writer bond pads 456 are spaced a distance 454 in the z-direction from surface 302a of the closure 302 of about 75 μm to about 85 μm, such as about 80 μm. The reader bond pads 458 are spaced a distance 466 in the z-direction from the writer bond pads 456 of about 45 μm to about 55 μm, such as about 50 μm. The reader bond pads 458 are further spaced a distance 468 in the z-direction from the second surface 450b of the chip 450 of about 45 μm to about 55 μm, such as about 50 μm. Furthermore, each writer bond pad 456 is spaced from adjacent writer bond pads 456 a distance 470 in the y-direction of about 85 μm to about 90 μm, such as about 87.5 μm, and each reader bond pad 458 is spaced from adjacent reader bond pads 458 the distance 470 in the y-direction of about 85 μm to about 90 μm, such as about 87.5 μm. Each writer bond pad 456 and each reader bond pad 458 has a length 472 in the z-direction of about 115 μm to about 125 μm, such as about 120 μm.

Two writer leads 460 connect the writer 306 of each data element 307 to the two writer bond pads 456, and two reader leads 462 connect the reader 308 of each data element 307 to the two reader bond pads 458 (i.e., one writer lead 460 and one reader lead 462 per writer bond pad 456 and reader bond pad 458, respectively). Each writer lead 460 has a length in the z-direction of about 210 μm to about 220 μm, such as about 215 μm. Each reader lead 462 has a length in the z-direction of about 380 μm to about 390 μm, such as about 382 μm. In some embodiments, the writer bond pads 456 and the reader bond pads 458 may be switched, in which case the writer leads 460 would have a greater length than the reader leads 462. Because the writer bond pads 456 and the reader bond pads 458 are stacked and staggered, the writer leads 460 and the reader leads 462 all have a reduced length compared to conventional modules. As such, the noise created by the writer and reader leads 460, 462 is reduced.

Figure 5A:
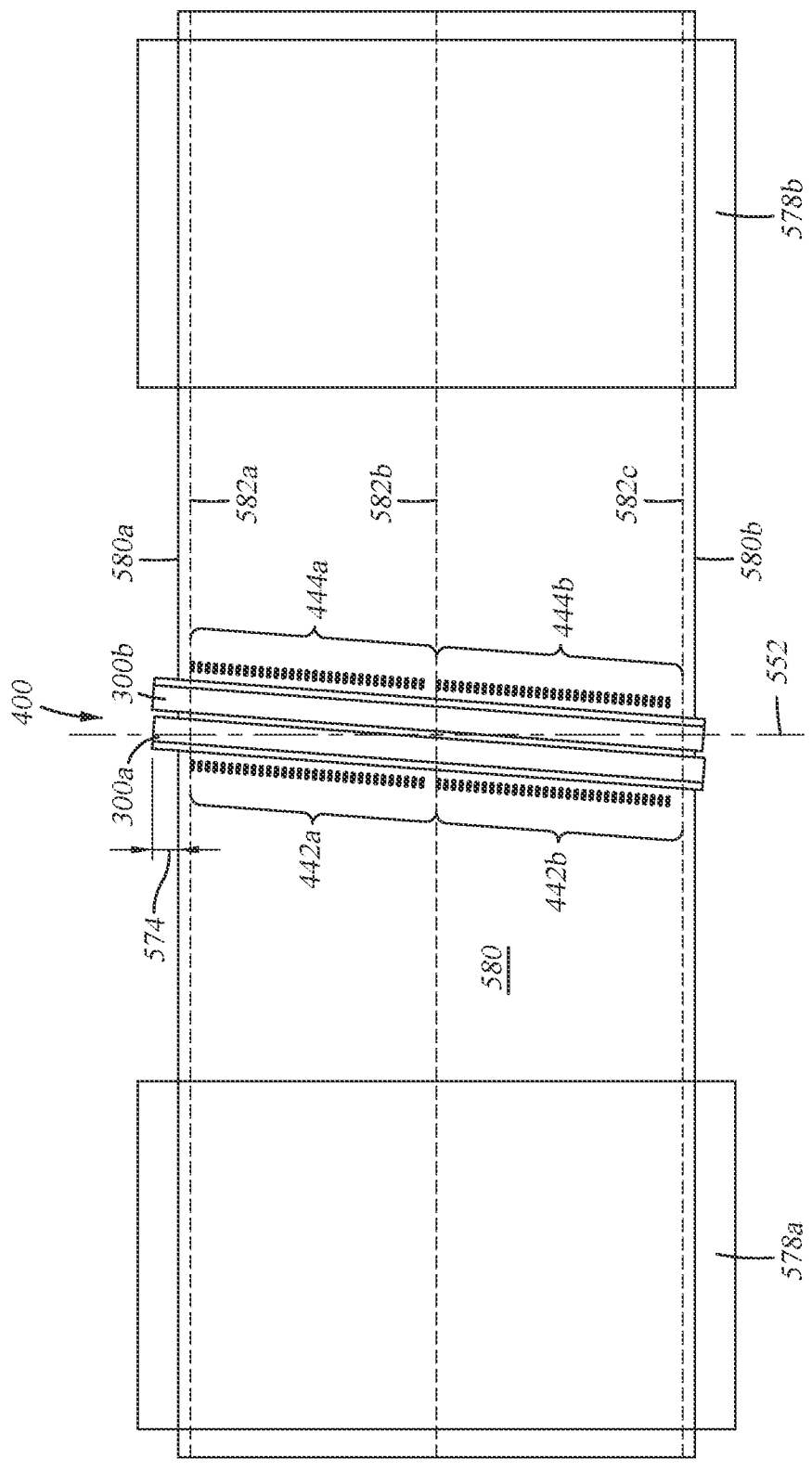
FIGS. 5A-5B illustrate the tape head of FIGS. 4A-4B writing to a tape, according to various embodiments.
Figure 5B:
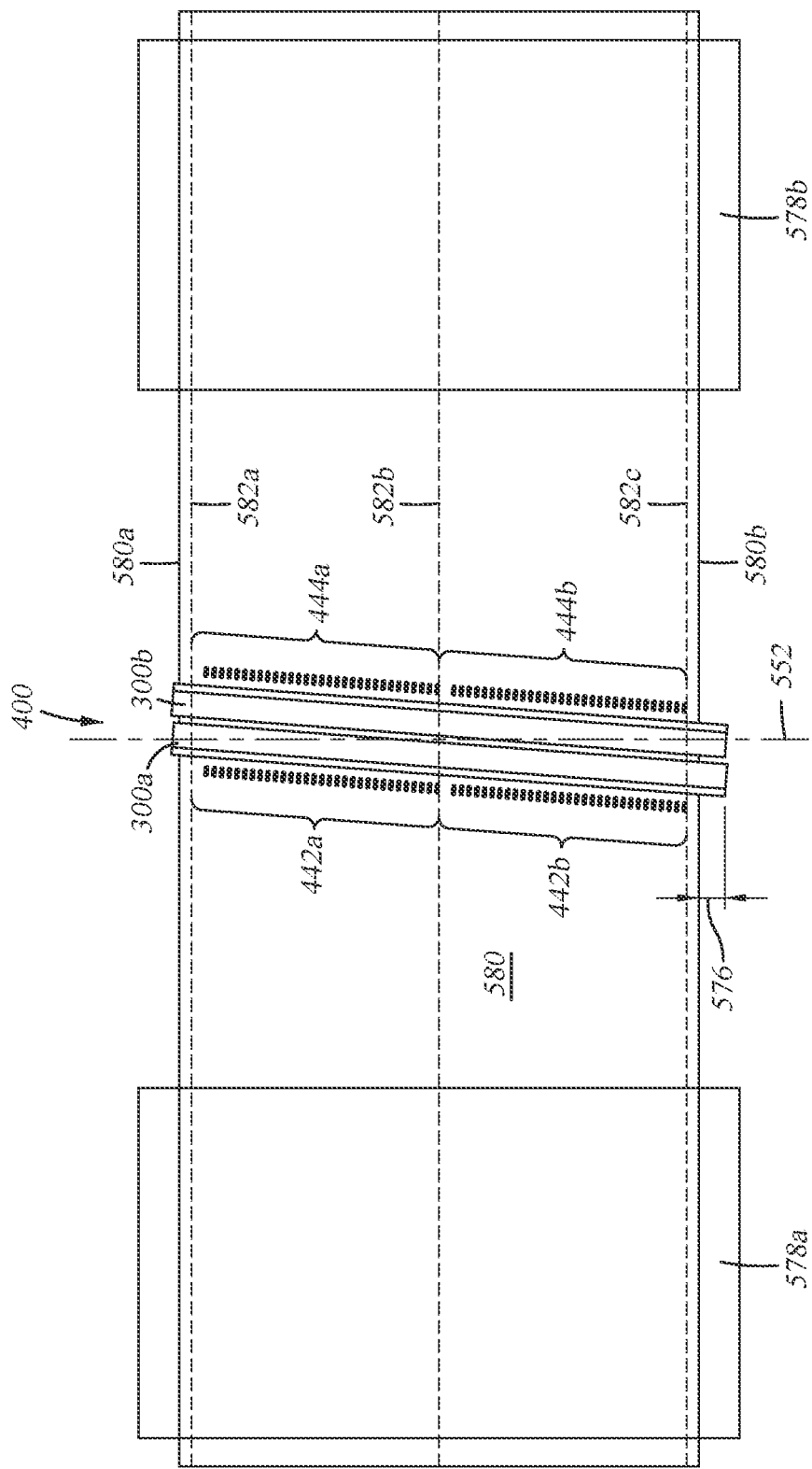

FIGS. 5A-5B illustrate the tape head 400 of FIGS. 4A-4B writing to a tape 580, according to various embodiments. FIG. 5A illustrates a first inbound wrap of the tape 580 (e.g., the tape 580 moving in the inbound direction or x-direction), and FIG. 5B illustrates a first outbound wrap of the tape 580 (e.g., the tape 580 moving in the outbound direction or −x-direction). The tape 580 is disposed on a first roller 578a and a second roller 578b, which are configured to move the 580 in the inbound and outbound direction. For the purposes of the descriptions of FIGS. 5A-5B, it is assumed the tape 580 has a width in the y-direction of 0.5 inches. The tape 580 is written to and/or read from in a serpentine manner. Thus, while only the first outbound and first inbound wraps are shown, the tape head 400 will be disposed at a plurality of locations over the tape 580.

The tape 580 comprises a plurality of data tracks (not shown) and three servo tracks 582a, 582b, 582c (collectively referred to as servo tracks 582). The tape head 400 is configured to write data to and read data from the plurality of data tracks, and the servo readers 440 of the tape head 400 are configured to read servo data or servo patterns, which is discussed further below, from the servo tracks 582. As shown in FIGS. 5A-5B, the tape head 400 is tilted from a central axis 522 about 1° to about 12°, such as about 5°±about 1°, when writing data to or reading data from the tape 580. While the tape head 400 is shown tilted in the clockwise direction, the tape head 400 may instead be tilted in the counter-clockwise direction.

The first sets 442a, 444a of writer 306a, 306b and reader 308a, 308b pairs of each SGV module 300a, 300b are disposed between the first servo track 582a and the second servo track 582b, and the second sets 442b, 444b of writer 306a, 306b and reader 308a, 308b pairs of each SGV module 300a, 300b are disposed between the second servo track 582b and the third servo track 582c. The plurality of data tracks are disposed between the first and second servo tracks 582a, 582b and between the second and third servo tracks 582b, 582c.

While not shown, the first groups 436a, 438a of servo readers 440a, 440b are configured to read the first servo track 582a, the second groups 436b, 438b of servo readers 440a, 440b are configured to read the second servo track 582b, and the third groups 436c, 438c of servo readers 440a, 440b are configured to read the third servo track 582c. As such, four servo readers 440a, 440b are configured to read from each of the servo tracks 582a, 582b, 582c, as each SGV module 300a, 300b comprises two servo readers 440a, 440b at each location corresponding to the servo tracks 582a, 582b, 582c.

At least two servo readers 440a, 440b of the tape head 400 are configured to read servo data from each servo track 582a, 582b, 582c at a time. For example, one servo reader 440a from the first pair 436a of the first SGV module 300a and one servo reader 440b from the first pair 438a of the second SGV module 300b may read the first servo track 582a at the same time, or both servo readers 440a from the first pair 436a of the first SGV module 300a (or both servo readers 440b of the first pair 438a of the second SGV module 300b) may read the first servo track 582a at the same time. While at least two servo readers 440a, 440b of the tape head 400 are configured to read servo data from each servo track 582a, 582b, 582c at a time, more than two servo readers 440a, 440b may be of the tape head 400 are configured to read servo data from each servo track 582a, 582b, 582c at a time. For instance, both servo readers 440a, 440b from both first groups 436a, 438a may be configured to read servo data from the first servo track 582a.

As shown in FIG. 5A, when the tape head 400 writes or reads data from the tape 580 in the first outbound direction (i.e., a leftmost position of the tape head 400), the tape head 400 overhangs a first edge 580a of the tape 580 a distance 574 of about 0.4 mm to about 0.8 mm in the y-direction. As shown in FIG. 5B, when the tape head 400 writes or reads data from the tape 580 in the first inbound direction (i.e., a right position of the tape head 400), the tape head 400 overhangs a second edge 580b of the tape 580 a distance 576 of about 0.4 mm to about 0.8 mm in the −y-direction. As the tape head 400 continues to write data to and read data from the tape 580, the overhang of the tape head 400 gradually lessens with each outbound and inbound wrap until the tape head 400 is centered over the tape 580 (shown in FIG. 6B). When the tape head 400 is centered over the tape 580, the tape head 400 overhangs both the first edge 580a and the second edge 580b of the tape 580 a distance of about 0.15 inches to about 0.2 inches.

FIG. 6A illustrates an exemplary servo pattern 600 of the tape 580 of FIGS. 5A-5B, which may be utilized with the tape head 400 of FIGS. 4A-4B, according to one embodiment. Similar to FIGS. 5A-5B, it is assumed the tape 580 has a width in the y-direction of 0.5 inches.

The servo pattern 600 has a width 684 from a first edge 581a of the servo track 582 to a second edge 581b of the servo track 582 of about 88 μm. The servo pattern 600 comprises a first plurality of data lines 686a disposed in a V-like shape and a second plurality of data lines 686b disposed in a V-like shape, where the first plurality of data lines 686a and the second plurality of data lines 686b open towards one another in a diamond-like shape. The first and second plurality of data lines 686a, 686b may be referred to as data lines 686. The first plurality of data lines 686a and the second plurality of data lines 686b are spaced apart a distance 688 of about 3 μm to about 5 μm at the first and second edges 581a, 581b of the servo track 582. In some embodiments, the first plurality of data lines 686a are apart a distance of about 3 μm to about 5 μm at a central inflection or turning point 685a, and the second plurality of data lines 686b are apart a distance of about 3 μm to about 5 μm at a central inflection or turning point 685b, line shown in FIG. 6B.

Each of the data lines 686 are disposed at about an 18° angle. For example, each of the data lines 686 extend from the inflection or turning points 685a, 685b at about an 18° angle. As compared to conventional servo patterns, the conventional servo patterns usually have a greater width, such as a width of about 90 μm, and are disposed at a smaller angle, such as about 12°. The increased angle of 18° of the servo pattern 600 produces better position accuracy for high density data tracks.

Figure 6B:
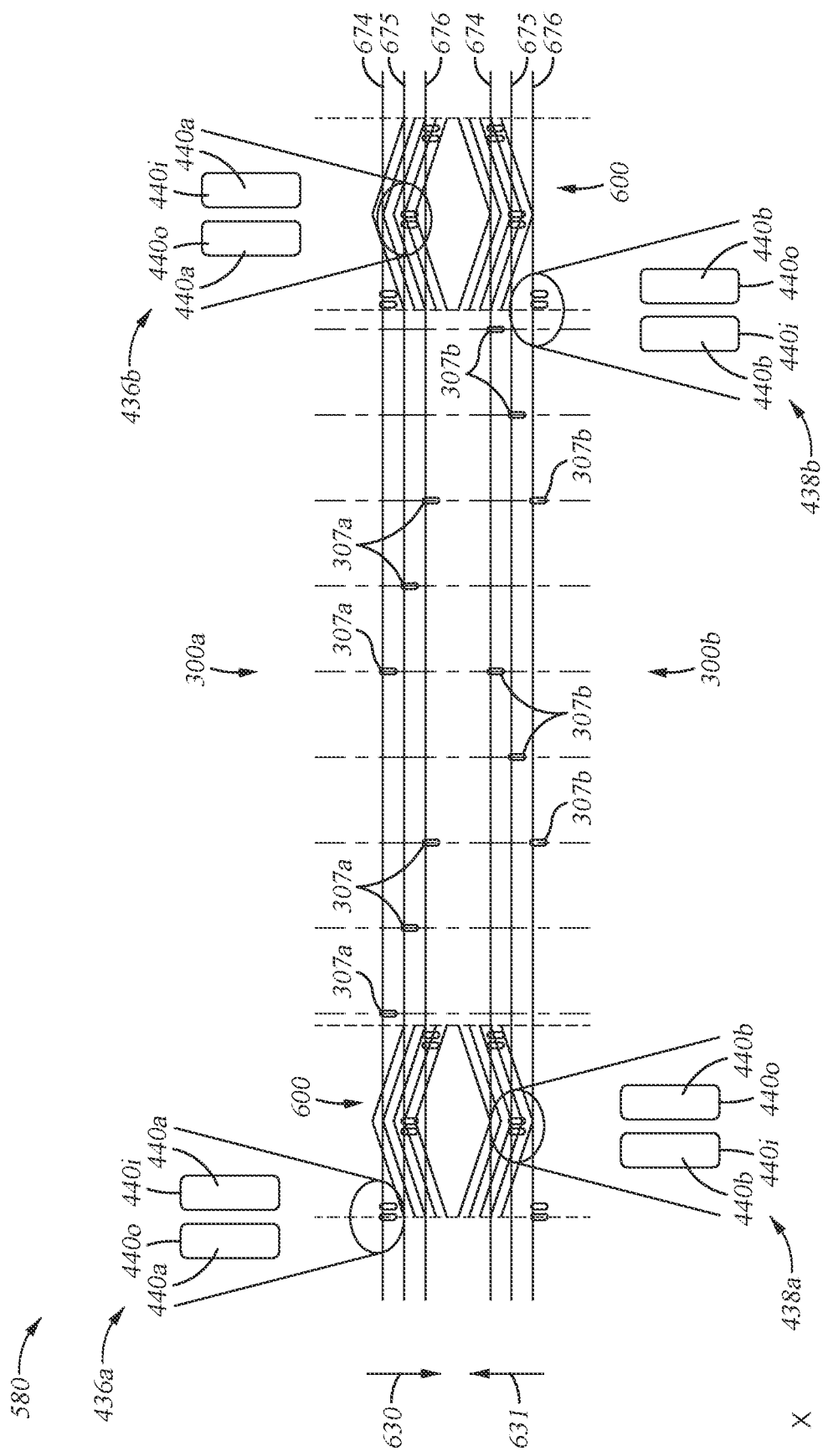
FIG. 6B illustrates the tape head of FIG. 4 reading the servo pattern of FIG. 6A, according to one embodiment.

FIG. 6B illustrates aspects of the tape head 400 of FIG. 4A reading the servo pattern 600 of FIG. 6A of the tape 580, according to one embodiment. While the tape head 400 and the modules 300a, 300b are not fully shown in FIG. 6B, first data elements 307a of the first module 300a and second data elements 307b of the second module 300b are shown. Furthermore, the first and second groups 436a, 436b of servo readers 440a of the first module 300a are shown, and the first and second groups 438a, 438b of servo readers 440b of the second module 300b are shown.

In FIG. 6B, lines 674 illustrate the tape head 400 being positioned in the leftmost position above the tape 580, like shown in FIG. 5A, lines 676 illustrate the tape head 400 being positioned in the rightmost position above the tape 580, like shown in FIG. 5B, and lines 675 illustrate the tape head 400 being positioned at a central position above the tape 580. The leftmost position of the tape head 400 shown by lines 674 illustrate the first outbound wrap of the tape 580, the rightmost position of the tape head 400 shown by lines 676 illustrate the first inbound wrap of the tape 580, and the central position of the tape head 400 shown by lines 675 illustrate a last outbound or inbound wrap of the tape 580. As the tape head 400 writes in the serpentine manner in additional wraps, the tape head 400 is positioned at one or more locations between the leftmost position and the central position when writing in the outbound direction 630 such that the tape head 400 is laterally positioned or moved with respect to the tape in the y-direction, and is positioned at one or more locations between the rightmost position and the central position when writing in the inbound direction 631 such that the tape head 400 is laterally positioned or moved with respect to the tape in the −y-direction.

In some embodiments, when the tape head 400 moves in the outbound direction 630, the first servo reader 440o of the first group 436a of the first module 300a (and/or the first servo reader 440o of the second group 436b of the first module 300a) (e.g., outbound servo readers 440o) are active, and when the tape head 400 moves in the inbound direction 631, the second servo reader 440i of the first group 436a of the first module 300a (and/or the second servo reader 440i of the second group 436b of the first module 300a) (e.g., inbound servo readers 440i) are active.

Comparatively, in some embodiments, when the tape head 400 moves in the outbound direction 630, the second servo reader 440o of the first group 438a of the second module 300b (and/or the second servo reader 440o of the second group 438b of the second module 300b) (e.g., outbound servo readers 440o) are active, and when the tape head 400 moves in the inbound direction 631, the first servo reader 440i of the first group 438a of the second module 300b (and/or the first servo reader 440i of the second group 438b of the second module 300b) (e.g., inbound servo readers 440i) are active.

Due to the tape head tilt as discussed above, when the tape head 400 is in certain positions, some of the servo readers may not be over the servo pattern 600. Embodiments here provide for multiple servo readers in combination in those tape head positions, allowing for the servo pattern 600 to be read, even when some servo readers are not over the servo pattern. The example tape head positions at lines 674, 675, and 676 are further described below.

As shown by lines 674, when the tape head 400 is positioned in the rightmost position above the tape 580, the first and second groups 436a, 436b of servo readers 440a of the first module 300a may not be positioned over the servo pattern 600. However, the first and second groups 438a, 438b of servo readers 440b of the second module 300b are positioned over the servo pattern 600. As such, when the tape head 400 is positioned in the rightmost position above the tape 580, the first and second groups 438a, 438b of servo readers 440b of the second module 300b may be utilized to position the tape head 400 accurately.

As shown by lines 676, when the tape head 400 is positioned in the leftmost position above the tape 580, the first and second groups 438a, 438b of servo readers 440b of the second module 300b may not be positioned over the servo pattern 600. However, the first and second groups 436a, 436b of servo readers 440a of the first module 300a are positioned over the servo pattern 600. As such, when the tape head 400 is positioned in the rightmost position above the tape 580, the first and second groups 436a, 436b of servo readers 440a of the first module 300a may be utilized to position the tape head 400 accurately.

As shown by lines 675, when the tape head 400 is positioned in the central position above the tape 580, both the first and second groups 436a, 436b of servo readers 440a of the first module 300a and the first and second groups 438a, 438b of servo readers 440b of the second module 300b are positioned over the servo pattern 600. As such, when the tape 580 moves in the outbound direction 630, the outbound servo readers 440o of both the first and second groups 436a, 436b of the first module 300a and the first and second groups 438a, 438b of the second module 300b may be active. When the tape 580 moves in the inbound direction 631, the inbound servo readers 440i of both the first and second groups 436a, 436b of the first module 300a and the first and second groups 438a, 438b of the second module 300b may be active.

While not shown, when writing data to and/or reading data from the tape 580 in a serpentine manner, the tape head 400 is positioned at one or more additional locations between the leftmost position (shown by lines 674) and the central position (shown by lines 675), as well as one or more additional locations between the central position (shown by lines 675) and the rightmost position (shown by lines 676). At the additional locations, one or more servo readers 440a, 440b of each of the first and second modules 300a, 300b may be disposed over the servo pattern 600, and as such, any combination of servo reader 440a, 440b activation discussed above may be utilized.

Figure 7A:
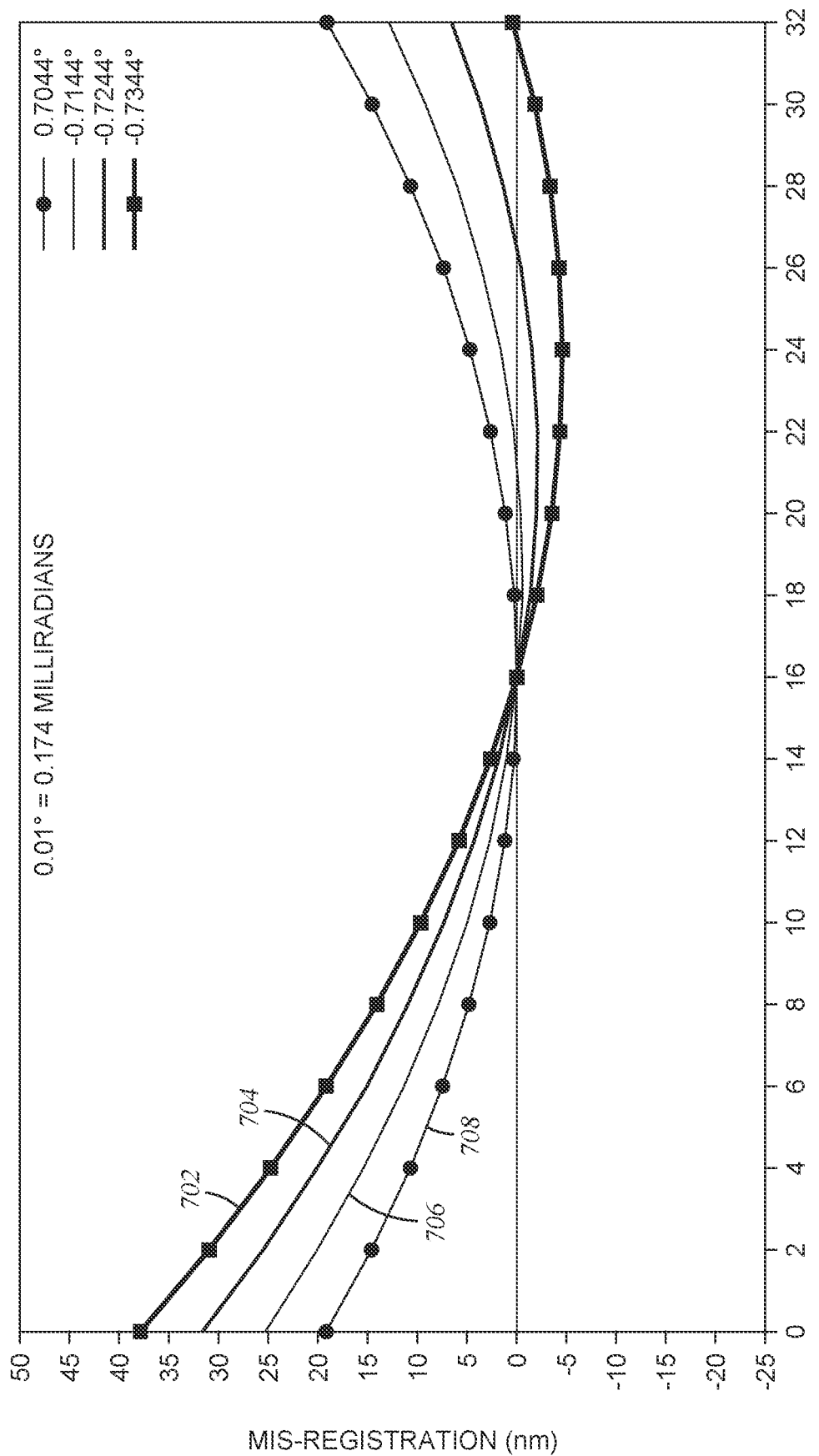
FIG. 7A illustrates a graph showing mis-registration (nm) of the tape head of FIGS. 4A-4B when tilted with respect to a tape for 32 tracks of the tape, according to one embodiment.

FIG. 7A illustrates a graph 700 showing mis-registration (nm) of the tape head 400 of FIGS. 4A-4B when tilted with respect to a tape experiencing TDS effects for 32 tracks of the tape, according to one embodiment. The graph 700 illustrates only 32 tracks of a tape, which may be 32 tracks between the first and second groups 436a, 436b or 438a, 438b of servo readers 440a, 440b, or between the second and third groups 436b, 436c or 438b, 438c of servo readers 440a, 440b, of the tape head 400 of FIGS. 4A-4B.

In the graph 700, the tape head 400 is statically tilted about 5°. Line 708 represents the tape head 400 being tilted an additional about 0.70°, line 706 represents the tape head 400 being tilted an additional about −0.71°, line 704 represents the tape head 400 being tilted an additional about −0.72°, and line 702 represents the tape head 400 being tilted an additional about −0.73°. Thus, line 702 represents the tape head 400 being tilted the greatest amount and line 708 represents the tape head 400 being tilted the least amount.

As shown by the graph 700, when the tape head 400 is tilted an additional about −0.73° (line 702), the tape head 400 may be mis-registered a maximum of about 37 nm at the outer tracks, but is substantially aligned with the central tracks of the tape. When the tape head 400 is tilted an additional about −0.72° (line 704), the tape head 400 may be mis-registered a maximum of about 32 nm at the outer tracks, but is substantially aligned with the central tracks of the tape. When the tape head 400 is tilted an additional about −0.71° (line 706), the tape head 400 may be mis-registered a maximum of about 25 nm at the outer tracks, but is substantially aligned with the central tracks of the tape. When the tape head 400 is tilted an additional about 0.70° (line 708), the tape head 400 may be mis-registered a maximum of about 20 nm at the outer tracks, but is substantially aligned with the central tracks of the tape. As such, tilting the tape head an additional about 0.70° helps mitigate mis-registration of the tape head 400 with respect to the tape when the tape has experience linear or non-linear TDS effects.

Figure 7B:
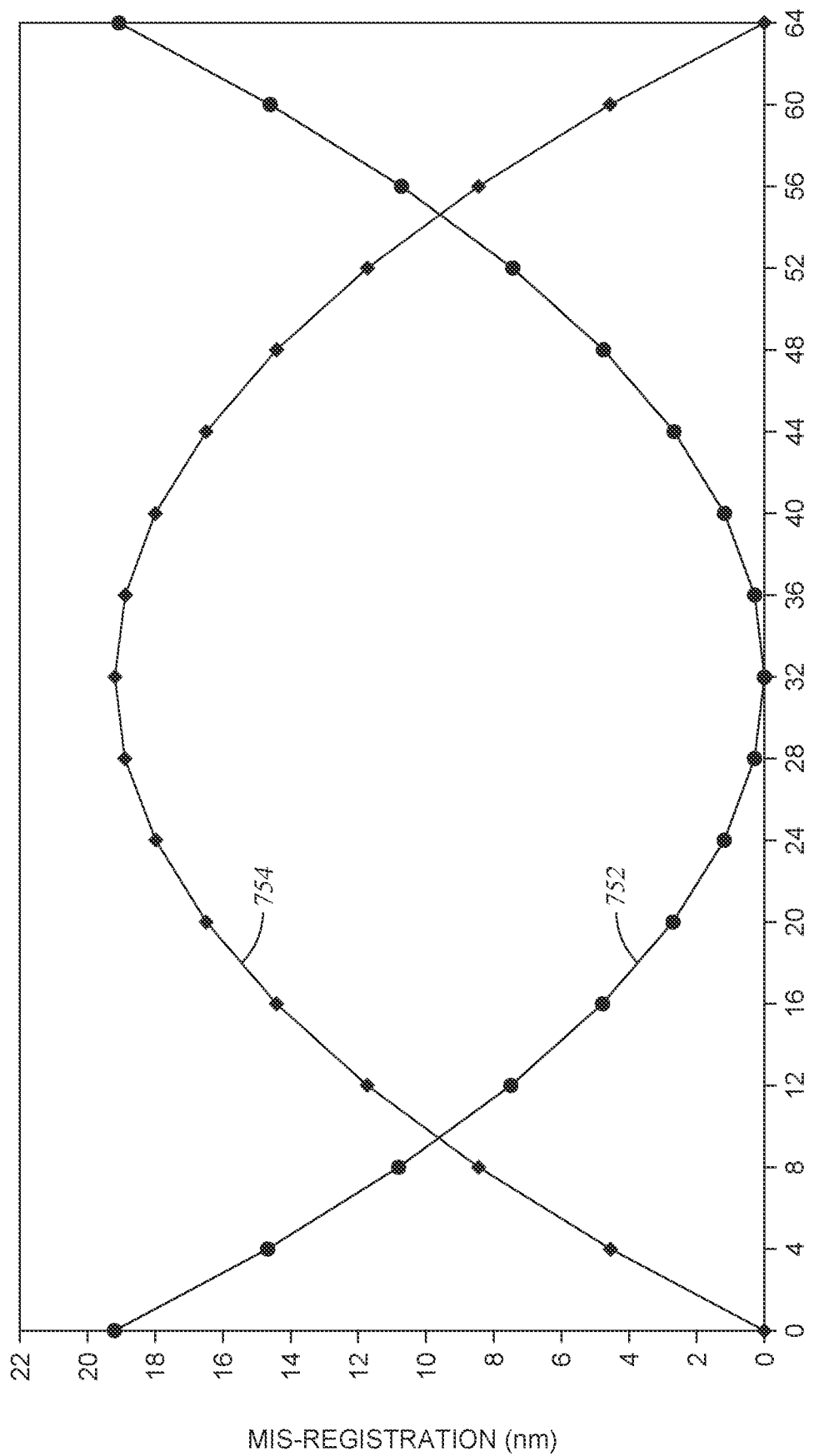
FIG. 7B illustrates a graph showing mis-registration (nm) of the tape head 400 of FIGS. 4A-4B when tilted with respect to a tape experiencing TDS effects when various different servo reader pairs are used to position the tape head, according to one embodiment.

FIG. 7B illustrates a graph 750 showing mis-registration (nm) of the tape head 400 of FIGS. 4A-4B when tilted with respect to a tape experiencing TDS effects when various different servo reader pairs or groups 440a, 440b are used to position the tape head 400, according to one embodiment. In the graph 750, the tape head 400 is statically tilted about 5°±−1°.

Line 752 illustrates using the first pairs 436a or 438a or third pairs 436c or 438c (e.g., the outer pairs) of servo readers 440a, 440b to position the tape head 400. Line 754 illustrates using the second or middle pairs 436b, 438b of servo readers 440a, 440b to position the tape head 400. As shown by line 752, when the outer servo readers 440a, 440b of either the first or third pairs 436a, 436c, 438a, 438c are used to position the tape head 400, the tape head 400 is fairly accurately positioned for tracks 0-12 and 52-64, but is mis-registered about 10 nm to about 20 nm for the central tracks 13-51. Conversely, when the center servo readers 440a, 440b of the second pairs 436b, 438b are used to position the tape head 400, the tape head 400 is fairly accurately positioned for tracks 8-56, and is mis-registered about 10 nm to about 20 nm for only the outermost tracks 0-7 and 57-64. As such, when the tape experiences linear or non-linear TDS, the tape head 400 may be more accurately positioned above a greater number of tracks when the center servo readers 440a, 440b of the second pairs 436b, 438b are selectively used in conjunction with the first or third outer pairs or groups of servo readers 436a, 438a, 436c, 438c to position the tape head 400.

FIGS. 8A-8D illustrate servo readers 840a, 840b of the tape head 400 of FIGS. 4A-4B, according to various embodiments. The servo readers 840a, 840b may be the servo readers 440a of the first module 300a and/or the servo readers 440b of the second module 300b.

Figure 8A:
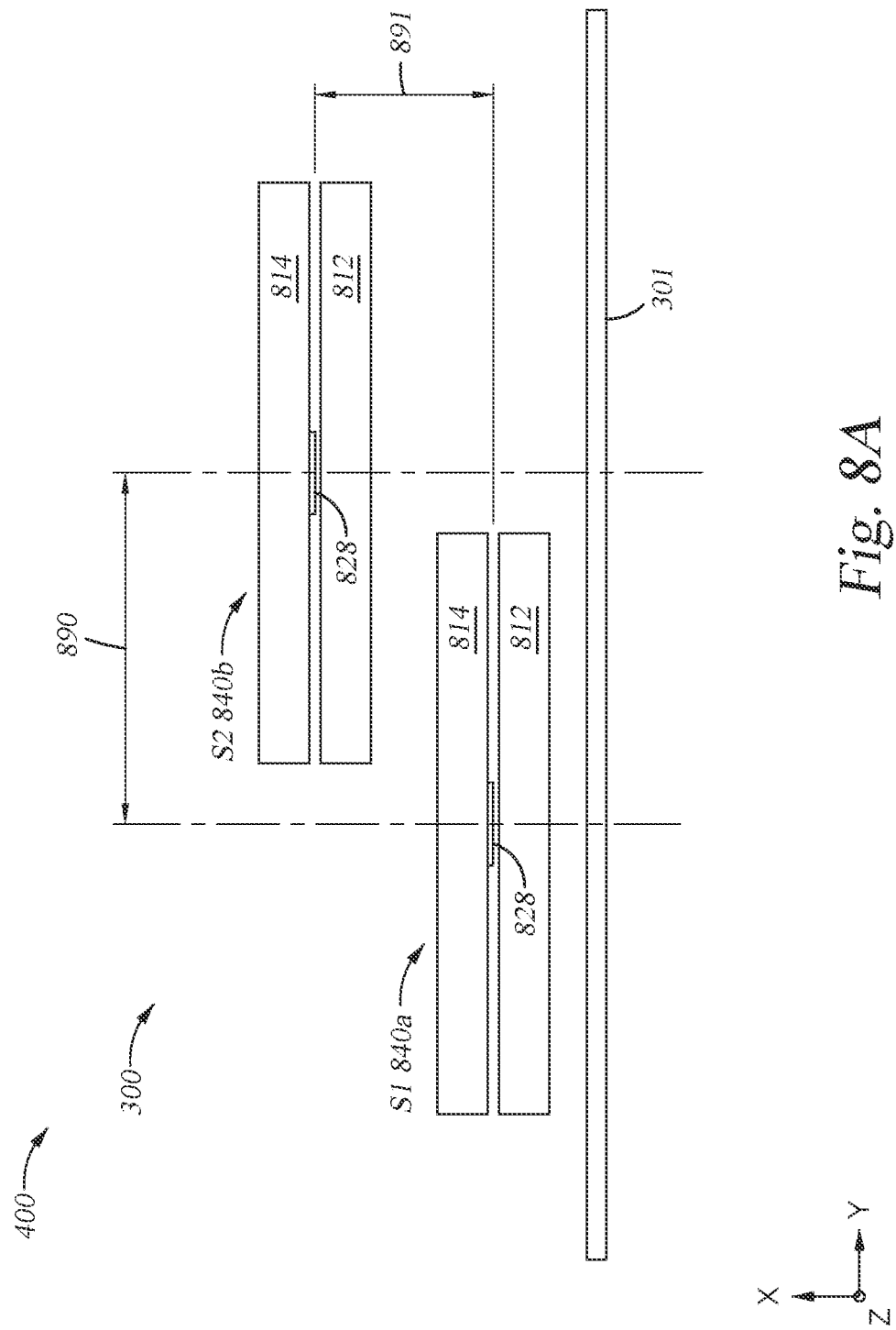
FIGS. 8A-8D illustrate servo readers of the tape head of FIGS. 4A-4B, according to various embodiments.

FIG. 8A illustrates two servo readers 840a, 840b of one module 300, which may be either the first module 300a and/or the second module 300b, of the tape head 400, according to one embodiment. While two servo readers 840a, 840b are shown, the module 300 may comprise a plurality of servo readers 840a, 840b, as discussed above. The first servo reader 840a and the second servo reader 840b both individually comprise a first shield 812, a second shield 814 disposed over the first shield 812, and a magnetic sensor 828 disposed between the first and second shields 812, 814. Each magnetic sensor 828 may be a TMR sensor, for example. The first and second servo readers 840a, 840b are two-dimensional magnetic recording (TDMR) servo readers.

The first servo reader (S1) 840a is disposed adjacent to a surface 301 of the module 300. The second servo reader (S2) 840b is offset from the first servo reader 840a in both the x-direction and the y-direction. As such, the first and second servo readers 840a, 840b are disposed on separate planes. The second servo read 840b is offset from the first servo reader 840a a distance 890 in the y-direction, or the cross-track direction, of about 1 µm to about 20 µm. The distance 890 may be measured from a center of the first servo reader 840a to a center of the second servo reader 840b. The second servo read 840b is offset from the first servo reader 840a a distance 891 the x-direction of about 0.5 µm to about 10 µm. The distance 891 may be measured from a center of the first servo reader 840a to a center of the second servo reader 840b. As shown in FIG. 8A, the first and second shields 812, 814 of each servo reader 840a, 840b overlap with one another in the y-direction. However, the magnetic sensors 828 of the first servo reader 840a does not overlap with any portion of the second servo reader 840b, and vice versa.

The first and second servo readers 840a, 840b are fabricated on different planes of a wafer in two different process steps, enabling the first and second servo readers 840a, 840b to be spaced the distance 890 apart. The first and second servo readers 840a, 840b may be formed in the same portion wafer has either the writers 306 of the module 300 and/or the readers 308 of the module 300. For example, as shown in FIG. 8D, the readers 308, the first servo readers 840a, and the second servo readers 840b are all formed in a first wafer portion 889a, and the writers 306 are formed in a second wafer portion 889b. The wafer portions refer to sections of the wafers containing the fabricated active elements after slicing, as a single wafer typically contains many such portions, which are sliced into the individual portions for additional processing and assembly. The first and second wafer portions 889a, 889b are coupled together, such as being glued together.

Generally, conventional servo readers are aligned in the x-direction (e.g., aligned in a row) but are offset a distance of about 15 µm or greater in the y-direction due to the manufacturing process, which limits how close servo readers can be formed next to one another. Thus, by offsetting the first and second servo readers 840a, 840b in both the x-direction and the y-direction, the first and second servo readers 840a, 840b can be spaced much closer together in at least the y-direction as compared to conventional servo readers.

Figure 8B:
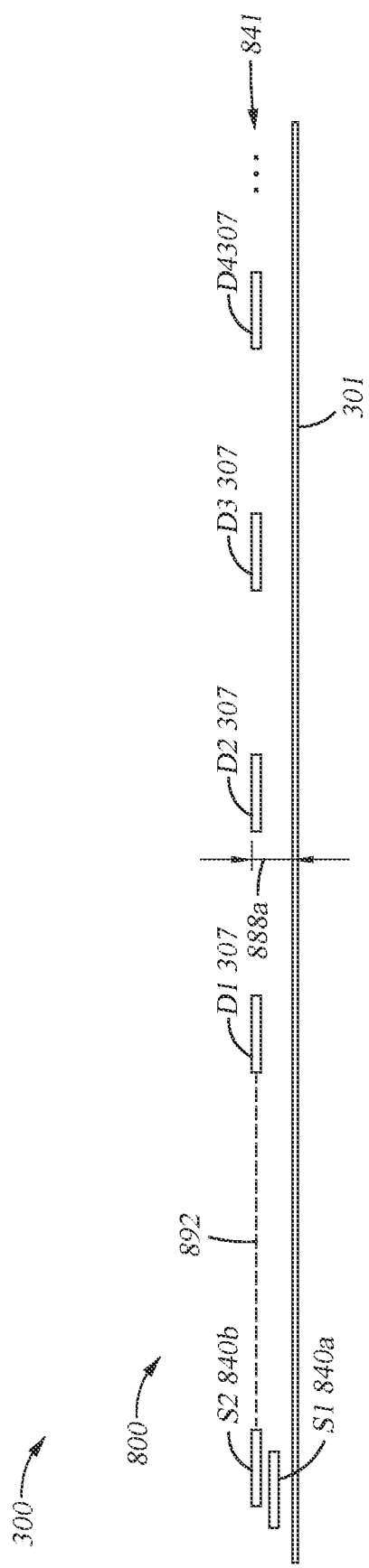
Figure 8C:
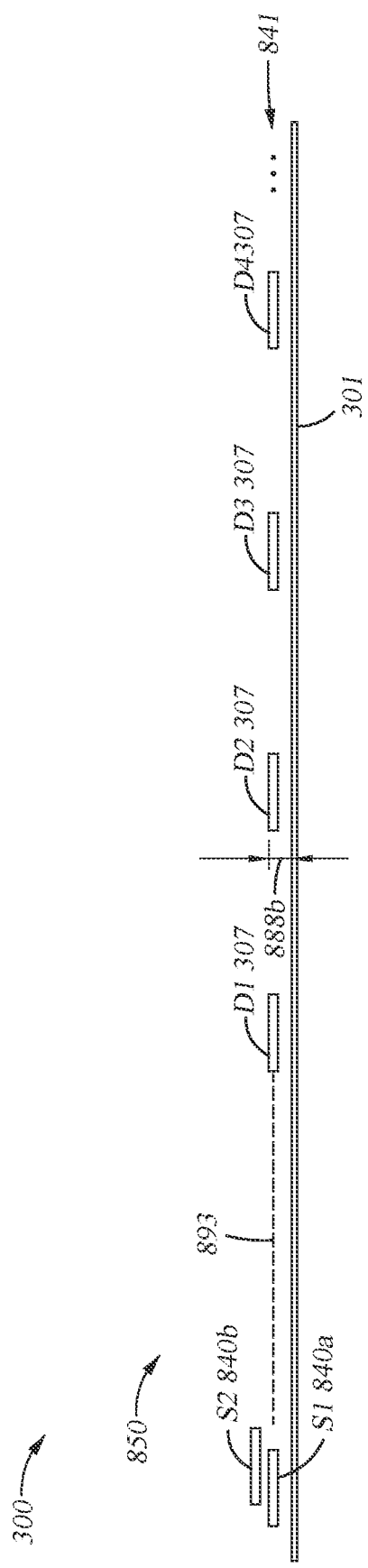
Figure 8D:
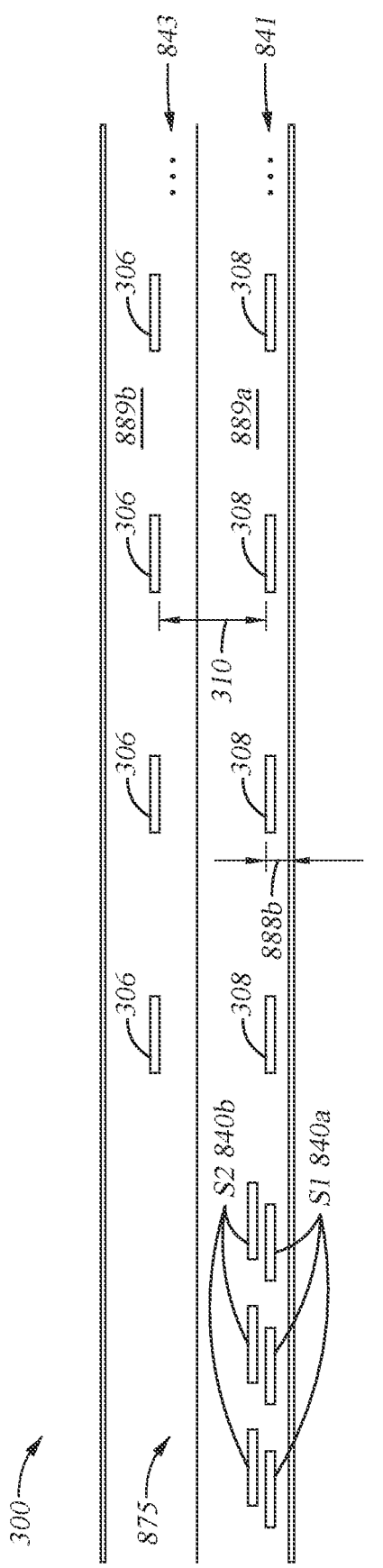

FIGS. 8B-8D illustrate various layouts 800, 850, 875, respectively, for the first and second servo readers 840a, 840b of FIG. 8A in a module 300 of the tape head 400, according to various embodiments. The data elements 307 of FIGS. 8B-8D may be either readers 308 or writers 306 of either the first or second module 300a, 300b of the tape head 400. While four data elements 307 (e.g., D1, D2, D3, D4) are shown, any number of data elements 307 may be utilized.

In the layout 800 of FIG. 8B, the second servo reader 840b is aligned in the y-direction, or the cross-track direction, with the row 841 of data elements 307, as shown by line 892. The first servo reader 840a is offset in the x-direction from the row 841 of data elements 307, and the first servo reader 840a is disposed adjacent to the surface 301 of the module 300. The second servo reader 840b and the data elements 307 are spaced a distance 888a of about 1 µm to about 20 µm from the surface 301 of the module 300. The first servo reader 840a is disposed a distance from the surface 301 of about 0.1 µm to about 5 µm. The first servo reader 840a is disposed closer to the surface 301 than the second servo reader 840b. The data elements may be either readers 308 or writers 306 of either the first or second module 300a, 300b of the tape head 400. While four data elements 307 (e.g., D1, D2, D3, D4) are shown, any number of data elements 307 may be utilized.

In the layout 850 of FIG. 8C, the first servo reader 840a is aligned in the y-direction, or the cross-track direction, with the row 841 of data elements 307, as shown by line 893. The second servo reader 840b is offset in the x-direction from the row 841 of data elements 307. The first servo reader 840a and the data elements 307 are spaced a distance 888b of about 0.1 µm to about 5 µm from the surface 301 of the module 300. The second servo reader 840b is disposed a distance from the surface 301 of about 1 µm to about 20 µm. The first servo reader 840a is disposed closer to the surface 301 than the second servo reader 840b. The data elements may be either readers 308 or writers 306 of either the first or second module 300a, 300b of the tape head 400. While four data elements 307 (e.g., D1, D2, D3, D4) are shown, any number of data elements 307 may be utilized.

The layout 875 of FIG. 8D is similar to the layout 850 of FIG. 8C; however, the layout 875 illustrates a plurality of first servo readers 840a, a plurality of second servo readers 840b, a plurality of readers 308, and a plurality of writers 306. In the layout 875, the plurality of first servo readers 840a are aligned in the y-direction with the row 841 of the plurality of readers 308. The plurality of second servo readers 840b are offset in the y-direction from both the row 841 of readers 308 and the row 843 of writers 306. The plurality of second servo readers 840b are disposed between the plurality of readers 308 and the plurality of writers 306. Moreover, each first servo reader 840a is disposed adjacent to a second servo reader 840b, but offset in both the x-direction and the y-direction from an adjacent second servo reader 840b. Each writer 306 is spaced a distance 310 from an adjacent reader 308 of about 6 µm to about 20 µm, such as about 6 µm to about 15 µm. In the layout 875, the readers 308, the first servo readers 840a, and the second servo readers 840b would all be formed in a first wafer (not shown) while the writers 306 would be formed in a second wafer (not shown).

While the first servo readers 840a are shown to be aligned with the readers 306, the first servo readers 840a may instead by aligned with the writers 306. Similarly, the second servo readers 840b may instead be aligned with the row 841 of readers 306 or the row 843 of writers 306 while the first servo readers 840a are offset from both the readers 308 and the writers 306. Furthermore, while three first servo readers 840a, three second servo readers 840b, four readers 308, and four writers 306 are shown, any number of first servo readers 840a, second servo readers 840b, readers 308, and writers 306 may be within the module 300. As such, the layout 875 is intended as an exemplary embodiment only.

Figure 9:
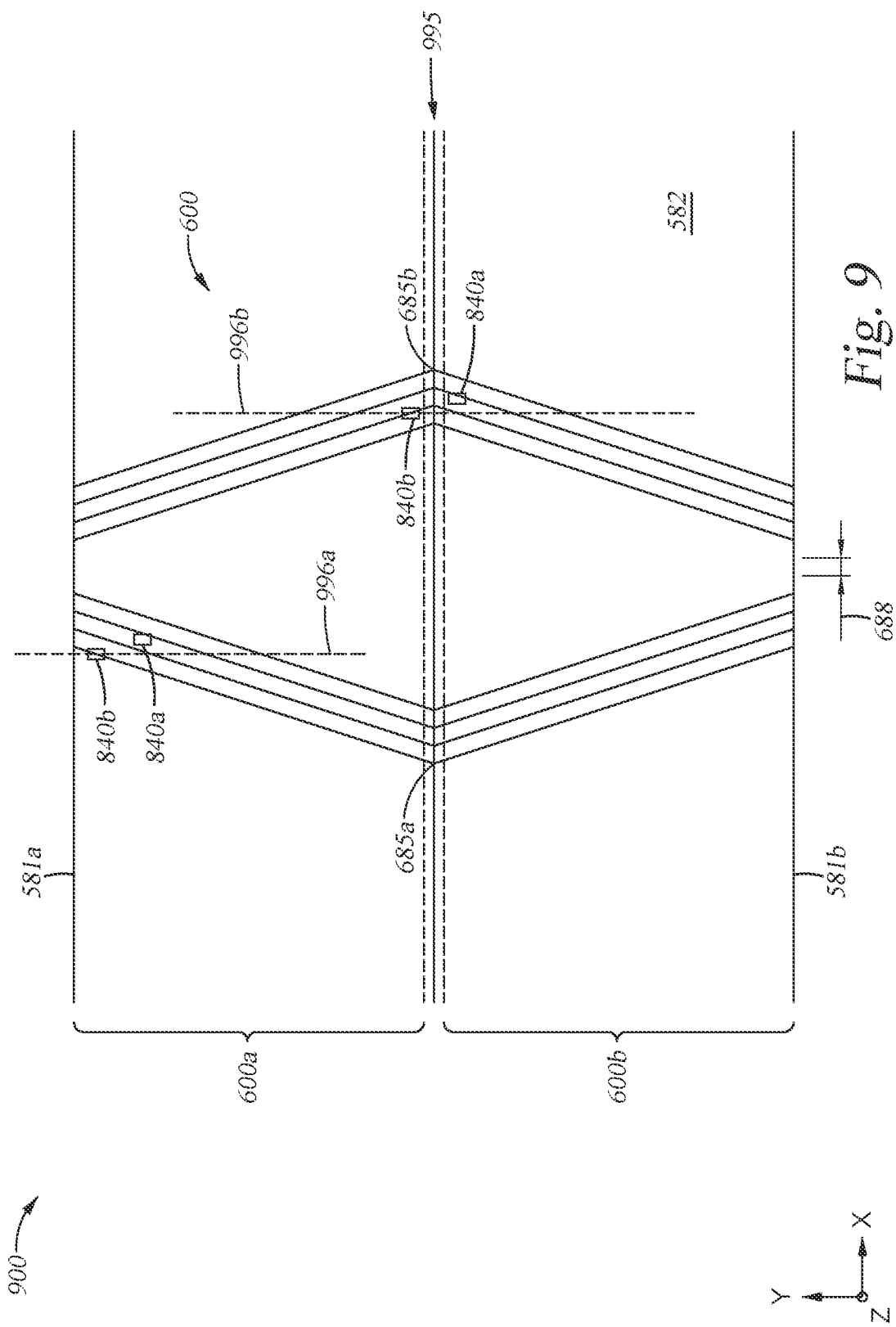
FIG. 9 illustrates the first and second servo readers of FIGS. 8A-8D reading the servo pattern of FIG. 6, according to one embodiment.

FIG. 9 illustrates the first and second servo readers 840a, 840b of FIGS. 8A-8D reading the servo pattern 600 of FIG. 6, according to one embodiment. In some embodiments, the servo pattern 600 may comprise a dead zone 995 through the inflection or turning points 685a, 685b, effectively partitioning the servo pattern 600 into a first or upper portion 600a and a second or lower portion 600b separated by the dead zone 995. The dead zone 995 may have a width in the y-direction of about 1 μm to about 5 μm.

The dead zone 995 may be an area of the servo pattern 600 where data is unable to be read from. As such, the first and second servo readers 840a, 840b are unable to read the servo pattern 600 in the dead zone 995, and thus, unable to position the tape head 400, when the tape head 400 is writing data to and/or reading data from a tape 582. In conventional tape heads having servo readers spaced apart a distance of about 15 μm or greater in the y-direction, the dead zone 995 of the servo pattern 600 translates or results in respective dead zones in the data tracks of the tape, as the tape head must skip over the dead zone 995 and be re-positioned in the second or lower portion 600b of the servo pattern 600. Such dead zones in the data tracks are areas where data would be unable to be written to or read from, resulting in unusable portions of the tape that could otherwise store data.

However, because the first and second servo readers 840a, 840b are spaced apart the distance 890 the y-direction of about 1 μm to about 10 μm, the first and second servo readers 840a, 840b are able to compensate for, or work around, the dead zone 995, which allows the data tracks to be fully utilized to store data without resulting dead zones in the data tracks. For example, as the tape head 400 is positioned over the tape 582 when writing and/or reading data, the tape 582 moves in a serpentine manner such that the tape 582 moves first in the −x-direction (i.e., positioning the tape head 400 from an initial position 996a towards the x-direction), then the tape 582 moves in the y-direction (i.e., positioning the tape head 400 towards the −y-direction), and then moves in the x-direction (i.e., positioning the tape head 400 towards the −x-direction), repeatedly.

As the tape moves in the serpentine manner, the first servo reader 840a reads the first or upper portion 600a of the servo pattern 600 from the initial position 996a until the dead zone 995 is reached or to a midway position 996b. From the midway position 996b, the second servo reader 840b takes over reading the second or lower portion 600b of the servo pattern 600. Due to the distance 890 of about 1 μm to about 10 μm in the y-direction that the first and second servo readers 840a, 840b are spaced apart, the first and second servo readers 840a, 840b are able to compensate for the dead zone 995, allowing the second servo reader 840b to read the servo pattern 600 once the first servo reader 840a reaches the dead zone 995.

Therefore, by offsetting the first and second servo readers in both the x-direction and y-direction, and spacing the first and second servo readers about 1 μm to about 20 μm apart, the dead zone of a servo pattern can be compensated for, which in turn allows more data to be stored in the data tracks of the tape. As such, the tape head 400 can continuously write to and/or read data from the tape without having to re-position to accommodate for the dead zone of a servo pattern.

In one embodiment, a tape head comprises one or more modules, each of the one or more modules comprising: a plurality of writers disposed in a first row, a plurality of readers disposed in a second row parallel to the first row, a first servo reader aligned with either the first row or the second row, and a second servo reader aligned in a third row parallel to the first and second rows, wherein: the first servo reader and the second servo reader are offset from one another in a first direction and in a second direction perpendicular to the first direction, the first direction being a cross-track direction, and the first servo reader and the second servo reader are spaced apart in the first direction about 1 μm to about 20 μm.

The first servo reader is aligned with the first row, and the first row is disposed adjacent to a surface of the module, and wherein the third row is disposed between the surface of the module and the first row. first servo reader is aligned with the second row, and the second row is disposed adjacent to a surface of the module, and wherein the third row is disposed between the surface of the module and the second row. The third row is disposed between the first row and the second row. The first servo reader and the second servo reader are spaced apart in the second direction about 1 μm to about 20 μm. A tape drive comprises the tape head.

In another embodiment, a tape head comprises one or more modules, each of the one or more modules comprising: a plurality of writers disposed in a first row, a plurality of readers disposed in a second row parallel to the first row, a first servo reader aligned with either the first row or the second row, the first servo reader comprising a first magnetic sensor, and a second servo reader aligned in a third row parallel to the first and second rows, wherein the second servo reader comprising a second magnetic sensor, and wherein the first magnetic sensor of the first servo reader and the second magnetic sensor of the at least one second servo reader are spaced apart in a first direction perpendicular to the first row a distance of about 1 μm to about 20 μm, the first direction being a cross-track direction.

A tape drive comprises the tape head, and a tape, wherein the first servo reader and the second servo reader are each individually configured to read a servo pattern from the tape. The servo pattern has a width across a servo band of the tape of about 88 μm. The servo pattern comprises a plurality of data lines, the plurality of data lines each being disposed at an angle of about 18°. The first magnetic sensor of the first servo reader and the second magnetic sensor of the second servo reader are spaced apart in a second direction perpendicular to the first direction a distance of about 1 μm to about 20 μm. The tape head further comprises three first servo readers, and three second servo readers. The plurality of writers is 64 writers, and wherein the plurality of readers is 64 readers. A tape drive comprises the tape head.

In yet another embodiment, a tape head comprises one or more modules, each of the one or more modules comprising: a plurality of writers disposed in a first row in a first wafer portion, a plurality of readers disposed in a second row parallel to the first row in a second wafer portion, the first and second wafer portions being coupled together, a first servo reader aligned with the second row in the second wafer portion, and a second servo reader aligned in a third row parallel to the first and second rows in the second wafer portion, wherein: the first servo reader and the second servo reader are spaced apart in a first direction perpendicular to the first row a first distance of about 1 μm to about 10 μm, and the first servo reader and the second servo reader are spaced apart in a second direction perpendicular to the first direction a second distance of about 1 μm to about 20 μm, the first direction being a cross-track direction.

The third row is disposed between the first row and the second row. The third row is disposed between the second row and a surface of the module. The first distance and the second distance are each individually measured from a first magnetic sensor of the first servo reader to a second magnetic sensor of the second servo reader. A tape drive comprises the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   one or more modules, each of the one or more modules comprising:
   a plurality of writers disposed in a first row;
   a plurality of readers disposed in a second row parallel to the first row;
   a first servo reader aligned with either the first row or the second row; and
   a second servo reader aligned in a third row parallel to the first and second rows, wherein:
   the first servo reader and the second servo reader are offset from one another in a first direction and in a second direction perpendicular to the first direction, the first direction being a cross-track direction, and
   the first servo reader and the second servo reader are spaced apart in the first direction about 1 μm to about 20 μm.

2. The tape head of claim 1, wherein the first servo reader is aligned with the first row.

3. The tape head of claim 2, wherein the first row is disposed adjacent to a surface of the module, and wherein the third row is disposed between the surface of the module and the first row.

4. The tape head of claim 1, wherein the first servo reader is aligned with the second row.

5. The tape head of claim 4, wherein the second row is disposed adjacent to a surface of the module, and wherein the third row is disposed between the surface of the module and the second row.

6. The tape head of claim 1, wherein the third row is disposed between the first row and the second row.

7. The tape head of claim 1, wherein the first servo reader and the second servo reader are spaced apart in the second direction about 1 μm to about 20 μm.

8. A tape drive comprising the tape head of claim 1.

9. A tape head, comprising:
   one or more modules, each of the one or more modules comprising:
   a plurality of writers disposed in a first row;
   a plurality of readers disposed in a second row parallel to the first row;
   a first servo reader aligned with either the first row or the second row, the first servo reader comprising a first magnetic sensor; and
   a second servo reader aligned in a third row parallel to the first and second rows, wherein the second servo reader comprising a second magnetic sensor, and wherein the first magnetic sensor of the first servo reader and the second magnetic sensor of the second servo reader are spaced apart in a first direction perpendicular to the first row a distance of about 1 μm to about 20 μm, the first direction being a cross-track direction.

10. A tape drive comprising:
    the tape head of claim 9; and
    a tape, wherein the first servo reader and the second servo reader are each individually configured to read a servo pattern from the tape.

11. The tape drive of claim 10, wherein the servo pattern has a width across a servo band of the tape of about 88 μm.

12. The tape drive of claim 10, wherein the servo pattern comprises a plurality of data lines, the plurality of data lines each being disposed at an angle of about 18°.

13. The tape head of claim 9, wherein the first magnetic sensor of the first servo reader and the second magnetic sensor of the second servo reader are spaced apart in a second direction perpendicular to the first direction a distance of about 1 μm to about 20 μm.

14. The tape head of claim 9, further comprising:
    three first servo readers; and
    three second servo readers.

15. The tape head of claim 9, wherein the plurality of writers is 64 writers, and wherein the plurality of readers is 64 readers.

16. A tape drive comprising the tape head of claim 9.

17. A tape head, comprising:
    one or more modules, each of the one or more modules comprising:
    a plurality of writers disposed in a first row in a first wafer portion;
    a plurality of readers disposed in a second row parallel to the first row in a second wafer portion, the first and second wafer portions being coupled together;
    a first servo reader aligned with the second row in the second wafer portion; and
    a second servo reader aligned in a third row parallel to the first and second rows in the second wafer, wherein:
    the first servo reader and the second servo reader are spaced apart in a first direction perpendicular to the first row a first distance of about 1 μm to about 10 μm, the first direction being a cross-track direction, and
    the first servo reader and the second servo reader are spaced apart in a second direction perpendicular to the first direction a second distance of about 1 μm to about 20 μm.

18. The tape head of claim 17, wherein the third row is disposed between the first row and the second row.

19. The tape head of claim 17, wherein the third row is disposed between the second row and a surface of the module.

20. The tape head of claim 17, wherein the first distance and the second distance are each individually measured from a first magnetic sensor of the first servo reader to a second magnetic sensor of the second servo reader.

21. A tape drive comprising the tape head of claim 17.

* * * * *